(12) United States Patent
Kobayashi et al.

(10) Patent No.: US 7,960,473 B2
(45) Date of Patent: Jun. 14, 2011

(54) THERMOPLASTIC RESIN COMPOSITION, PRODUCTION METHOD THEREOF, AND MOLDED ARTICLE

(75) Inventors: Sadayuki Kobayashi, Nagoya (JP); Daisuke Sato, Nagoya (JP); Masaru Akita, Nagoya (JP); Hiroshi Jinnai, Kyoto (JP); Takashi Inoue, Yonezawa (JP)

(73) Assignee: Toray Industries, Inc. (JP)

( * ) Notice: Subject to any disclaimer, the term of this patent is extended or adjusted under 35 U.S.C. 154(b) by 222 days.

(21) Appl. No.: 12/293,697

(22) PCT Filed: Mar. 22, 2007

(86) PCT No.: PCT/JP2007/055825
§ 371 (c)(1),
(2), (4) Date: Oct. 27, 2008

(87) PCT Pub. No.: WO2007/108501
PCT Pub. Date: Sep. 27, 2007

(65) Prior Publication Data
US 2010/0273944 A1    Oct. 28, 2010

(30) Foreign Application Priority Data

Mar. 23, 2006  (JP) ................. 2006-080035
Mar. 23, 2006  (JP) ................. 2006-080037

(51) Int. Cl.
*C08L 67/00* (2006.01)
*C08L 71/02* (2006.01)
*C08L 77/00* (2006.01)
*C08L 81/04* (2006.01)

(52) U.S. Cl. ................... 525/92 B; 525/92 D; 525/92 E; 525/92 F; 525/92 J; 525/175; 525/176; 525/177; 525/178; 525/179; 525/183; 525/185; 525/189

(58) Field of Classification Search ............... 525/92, 525/92 B, 92 D, 92 E, 92 F, 92 J, 175, 176, 525/177, 178, 179, 183, 185, 189
See application file for complete search history.

(56) References Cited

U.S. PATENT DOCUMENTS 3,306,874 A  2/1967 Hay
3,845,163 A  10/1974 Murch

FOREIGN PATENT DOCUMENTS

| JP | 2-214772 A | 8/1990 |
| JP | 2002-264126 A | 9/2002 |
| JP | 2003-213011 A | 7/2003 |
| JP | 2005-187809 A | 7/2005 |
| JP | 2006-089701 A | 4/2006 |
| JP | 2006-176676 A | 7/2006 |
| JP | 2006-347151 A | 12/2006 |

OTHER PUBLICATIONS

Kazuhiro Yamauchi et al., "Microdomain Morphology in an ABC 3-Miktoarm Star Terpolymer: A Study by Energy-Filtering TEM and 3D Electron Tomography," Macromolecules, vol. 36, 2003, pp. 6962-6966.

*Primary Examiner* — Ana L Woodward
(74) *Attorney, Agent, or Firm* — DLA Piper LLP (US)

(57) ABSTRACT

A thermoplastic resin composition includes a thermoplastic resin (A) and a reactive functional group-containing resin (B), which has a specific structure in the morphology of the resin composition observed by transmission electron microscopy tomography, and the relaxation time T1C of each carbon nucleus by the solid NMR measurement of the thermoplastic resin composition containing a polyamide resin is kept in a specific range. The composition is excellent in the balance between contradictory properties such as impact resistance and heat resistance, remarkably exhibits a peculiar viscoelastic behavior not observed in the conventional polymeric materials, and is remarkably excellent in impact energy absorbing performance and vibration energy absorbing performance at the time of high-speed deformation.

21 Claims, 6 Drawing Sheets

THERMOPLASTIC RESIN COMPOSITION, PRODUCTION METHOD THEREOF, AND MOLDED ARTICLE

RELATED APPLICATIONS

This is a §371 of International Application No. PCT/JP2007/055825, with an international filing date of Mar. 22, 2007 (WO 2007/108501 A1, published Sep. 27, 2007), which is based on Japanese Patent Application Nos. 2006-080035, filed Mar. 23, 2006, and 2006-080037, filed Mar. 23, 2006.

TECHNICAL FIELD

This disclosure relates to a thermoplastic resin composition excellent in the balance between contradictory properties such as impact resistance and heat resistance, capable of remarkably exhibiting a peculiar viscoelastic behavior not observed in the conventional polymeric materials, and remarkably excellent in impact energy absorbing performance and vibration energy absorbing performance at the time of high-speed deformation, by forming three-dimensionally connective structures containing a continuous phase component in the respective dispersed phase particles of a dispersed phase and controlling the rate of the area of the connective structures occupying the section of each dispersed phase particle of the dispersed phase in the case where the thermoplastic resin composition is a thermoplastic resin composition containing a reactive functional group-containing resin, or by controlling the relaxation time of a polyamide resin in the case where the thermoplastic resin composition is a thermoplastic resin composition containing the polyamide resin. This disclosure also relates to a production method thereof. In more detail, this disclosure relates to a thermoplastic resin composition for impact absorbing members, which has sufficient heat resistance at room temperature, and allows only a low maximum load to act on the object protected by it and can absorb large energy without being fractured even when the thermoplastic resin composition is subjected to a large-load high-speed impact.

BACKGROUND

In recent years, the demand for the performance and functions of polymeric materials becomes severe day by day, and especially high balance between contradictory properties is requested. For example, the compatibility between impact resistance and stiffness and the compatibility between weight reduction and strength are required for automobile materials, and the compatibility between impact resistance and heat resistance is required for size reduction of electric and electronic apparatus materials. There is no end to the required compatibility list. Further for promoting the practical use of polymeric materials as commercial products in recent years, active efforts are being made for application as automobile parts, application as sporting goods, application as architectural materials, application as electric and electronic apparatus parts, etc., and among these applications, increasing applications require energy absorbability such as impact absorbability and vibration absorbability.

For example, for application as automobile parts, so-called impact energy absorbing members are proposed in terms of both structures and materials, to be installed between interior parts and car body panels for protecting human bodies from the impacts of collisions. In terms of materials, the impact energy absorbing members are required to have the flexibility of being deformed at low stress without being brittle-fractured even if collisions should occur, and it is necessary to satisfy this property without impairing heat resistance and stiffness. In addition, in recent years, these required properties are more and more sophisticated and diversified, and it is virtually difficult to let one polymer respond to them. Therefore, in recent years, polymer alloy techniques using multiple polymers are main approaches for the development of polymeric materials. Especially at present, active attempts are being made to dramatically improve properties by sophisticated control of morphologies.

For example, disclosed is a method for achieving the compatibility between impact resistance and flexural modulus of elasticity by forming a dispersed phase composed of a rubber component in a continuous phase composed of polypropylene resin and letting a modified polypropylene resin and a compound capable of reacting with the modified polypropylene resin exist in the dispersed phase (JP 08-183887 A). Furthermore, disclosed is a method for improving impact resistance without impairing weather resistance, transparency, scratch resistance and stiffness, by forming a morphology having a micro-phase separated structure compositely containing a portion of a (meth)acrylic polymer component, wherein at least a portion of the (meth)acrylic polymer component and at least a portion of a modified urethane elastomer component are chemically bound to each other (JP 2000-319475 A). Furthermore, disclosed is a method for improving impact resistance, brittle temperature, stiffness, surface hardness and tensile fracture elongation in good balance, by dispersing a hydrogenated block copolymer into a continuous phase composed of a polypropylene-based resin and a dispersed phase composed of a rubbery polymer respectively (JP 2001-106844 A).

Moreover, among polymeric materials, especially engineering plastics are widely used in various industrial fields as structural materials, functional materials, etc., since they are excellent in heat resistance, mechanical properties and impact resistance.

Also with regard to typical engineering plastics such as polyamide resins, since those plastics used respectively alone are limited in practical applications, improvements by alloying with other resins are being made. Especially in recent years, improvements by control of morphologies are actively being made.

As an example of improving properties by controlling the morphology, disclosed is a method for enhancing the impact strength and the surface peel strength of a resin composition consisting of a continuous phase composed of a polyamide resin and a dispersed phase of particles composed of a polyolefin modified by an α,β-unsaturated carboxylic acid, dispersed in the continuous phase, wherein the number average particle size and the particle size distribution of the dispersed phase are controlled (JP 09-31325 A).

Further, disclosed is a method for improving low water absorbability, dimensional stability, stiffness, toughness and moldability in good balance by letting a dispersed phase with a core-shell particle structure consisting of a modified polyolefin and an unmodified polyolefin exist in a continuous phase composed of a polyamide resin (JP 07-166041 A).

Furthermore, disclosed is a resin composition comprising a thermoplastic resin and a reactive functional group-containing resin, excellent in stiffness, impact resistance and appearance after deformation, by forming one of the resins as a continuous phase and the other resin as a dispersed phase or by forming both the resins as continuous phases (co-continuous phase) and letting fine particles of 300 nm or less exist in the continuous phase and the dispersed phase or in the co-continuous phase (JP 2005-187809 A).

Moreover, in recent years, new experimental methods for evaluating and analyzing materials by three-dimensionally and directly observing the real spaces of heterogeneous structures of polymers (three-dimensional imaging or three-dimensional microscopy) attract attention. Methods effective for three-dimensional observation of polymeric materials include confocal laser scan microscopy, X-ray CT, three-dimensional NMR microscopy, transmission electron microscopy tomography (TEMT), etc. Among them, partly because of the recent nanotechnology boom, TEMT with nanometer scale resolution attracts attention. For example, the document of Macromolecules, 36, 6962-6966 (2003) discloses three-dimensional observations and analyses of block copolymers using TEMT.

Further, typical impact absorbing materials include thermoplastic elastomers typified by polyurethane, but they are often limited in the applicable range because of low heat resistance and, in recent years, materials excellent in heat resistance and impact resistance are developed as polymer alloys. Especially U.S. Pat. No. 3,845,163 and JP 51-151797 A disclose thermoplastic compositions excellent in heat resistance and impact resistance, respectively consisting of a polyamide and an ionomer. However, when these materials are subjected to large-load high-speed impacts, they allow a large maximum load to act on the objects protected by them and the materials per se are fractured. So, materials with more excellent impact absorbability are being demanded in this situation.

JP 2005-187809 A discloses a resin composition comprising a thermoplastic resin and a reactive functional group-containing resin excellent in stiffness, impact resistance and appearance after deformation, by forming one of the resins as a continuous phase and the other resin as a dispersed phase or by forming both the resins as continuous phases (co-continuous phase) and letting fine particles of 300 nm or less exist in the continuous phase and the dispersed phase or in the co-continuous phase. Further, JP 2006-89701 A discloses a resin composition and an impact absorbing member that decline in elastic modulus and becomes softer with the increase of stress rate. However, in neither of the resin compositions, no sophisticated structural control is performed in the dispersed phase, and the resin compositions cannot sufficiently absorb large-load high-speed impacts.

However, according to the methods described in JP 08-183887 A and JP 2000-319475 A, a second dispersed phase merely exists in another dispersed phase (first dispersed phase) in a continuous phase, and no sophisticated structural control is performed. So, the effect of improving the mechanical properties is insufficient. Further, according to the method described in JP 2001-106844 A, the second dispersed phase merely (1) exists at the interfaces between the continuous phase and the first dispersed phase and/or (2) deeply penetrates into the first dispersed phase or exists like lakes (like salami), and no sophisticated structural control is performed. So the effect of improving mechanical properties is insufficient. Furthermore, according to the method described in JP 09-31325 A, the basic phase structure is a simple sea-isle structure and, even if impact resistance can be enhanced, there is a problem that other properties decline. Moreover, according to the method described in JP 07-166041 A, the dispersed phase in the continuous phase merely has a core-shell structure, and the balance of mechanical properties is not sufficient. Further, according to the method described in JP 2005-187809 A, fine particles merely exist in the continuous phase/dispersed phase, and the balance of mechanical properties is not sufficient. Furthermore, if the resin compositions described in JP 08-183887 A, JP 2000-319475 A, JP 2001-106844 A, JP 09-31325 A and JP 07-166041 A are pulled at a higher speed in a tensile test, the elastic modulus becomes high, namely, the resin compositions become hard and fragile, showing the behavior as observed with general polymeric materials. On the other hand, if the resin composition described in JP 2005-187809 A is pulled at a higher speed in a tensile test, the elastic modulus declines, namely, the resin composition becomes soft, showing a peculiar viscoelastic behavior. However, since no sophisticated structural control is performed in the dispersed phase, the exhibited peculiar viscoelastic behavior is not sufficiently effective.

Meanwhile, in the conventional use of TEMT, three-dimensional observations and analyses of micro-phase separated structures of block copolymers, etc. have been performed, but in connection with thermoplastic resin compositions, there has been no case where three-dimensionally connective structures containing a continuous phase component formed in the respective dispersed phase particles of a dispersed phase have been confirmed.

SUMMARY

We provide a thermoplastic resin composition excellent in the balance between contradictory properties such as impact resistance and heat resistance, capable of remarkably exhibiting a peculiar viscoelastic behavior not observed in the conventional polymeric materials, and remarkably excellent in impact energy absorbing performance and vibration energy absorbing performance at the time of high-speed deformation, by forming three-dimensionally connective structures containing a continuous phase component in the respective dispersed phase particles of a dispersed phase and controlling the rate of the area of the connective structures occupying the section of each dispersed phase particle of the dispersed phase in the case where the thermoplastic resin composition is a thermoplastic resin composition containing a reactive functional group-containing resin, or by controlling the relaxation time of a polyamide resin in the case where the thermoplastic resin composition is a thermoplastic resin composition containing the polyamide resin. We also provide a production method thereof. In more detail, we address the problem of providing a thermoplastic resin composition for impact absorbing members, which has sufficient heat resistance at room temperature, and allows only a low maximum load to act on the object protected by it and can absorb large energy without being fractured even when the thermoplastic resin composition is subjected to a large-load high-speed impact.

We studied intensively to solve the abovementioned problem, and as a result found that a thermoplastic resin composition containing a reactive functional group-containing compound in which the structure of the dispersed phase is controlled in a sophisticated manner, or a thermoplastic resin composition containing a polyamide resin in which the relaxation time of its polyamide resin is controlled, is excellent in the balance of contradictory properties such as impact resistance and heat resistance, remarkably exhibits a peculiar viscoelastic behavior not observed in the conventional polymeric materials and is remarkably excellent in impact energy absorbing performance and vibration energy absorbing performance at the time high-speed deformation. Thus, this disclosure has been completed.

We provide:
(1) A thermoplastic resin composition comprising a thermoplastic resin (A) and a reactive functional group-containing resin (B), characterized in that in the morphology of the resin composition observed by transmission electron microscopy tomography, either the resin (A) or (B) forms a continuous phase, while the other resin forms a dispersed phase, that three-dimensionally connective structures Cs containing the continuous phase component are formed in the respective dispersed phase particles of the dispersed phase, and that the rate of the area of the connective structures Cs occupying the section of each dispersed phase particle Dp with an average particle size of 1,000 nm or less of the dispersed phase is 10% or more.

(2) A thermoplastic resin composition, according to (1), wherein the thermoplastic resin (A) is at least one selected from polyamide resins, polyester resins, polyphenylene sulfide resins, polyacetal resins, styrene-based resins, polyphenylene oxide resins and polycarbonate resins.

(3) A thermoplastic resin composition, according to (1), wherein the thermoplastic resin (A) is a polyamide resin.

(4) A thermoplastic resin composition comprising a polyamide resin (A1) and a reactive functional group-containing resin (B), wherein in the relaxation time T1C of each carbon nucleus by solid NMR measurement, the longer relaxation time T1C1 among the two relaxation times in the two-component analysis of the relaxation time corresponding to the carbon of each carbonyl group of the polyamide resin (A1) is 65 seconds or less, while the longer relaxation time T1C2 among the two relaxation times in the two-component analysis of the relaxation time corresponding to the carbon of the hydrocarbon group adjacent to each NH group of the polyamide resin (A1) is 15 seconds or less.

(5) A thermoplastic resin composition, according to (4), wherein the polyamide resin (A1) is polyamide 6.

(6) A thermoplastic resin composition, according to any one of (1) through (5), wherein the reactive functional group-containing resin (B) is a rubbery polymer.

(7) A thermoplastic resin composition, according to any one of (1) through (6), wherein the reactive functional groups of the reactive functional group-containing resin (B) are at least one type selected from amino groups, carboxyl groups, carboxyl metal salt, epoxy groups, acid anhydride groups and oxazoline groups.

(8) A thermoplastic resin composition, according to any one of (1) through (7), wherein in the case where JIS 5A dumbbell specimens (75 mm long, 12.5 mm wide at ends, and 2 mm thick) produced by injection-molding the resin composition are tensile-tested, the molded specimens have a property of $E(V1)>E(V2)$, if $V1<V2$, where $E(V1)$ and $E(V2)$ are tensile elastic modulus values at stress rates of V1 and V2.

(9) A thermoplastic resin composition, according to (8), wherein when the molded specimens are tensile-tested, the molded specimens satisfy $\epsilon(V1)<\epsilon(V2)$, if $V1<V2$, wherein $\epsilon(V1)$ and $\epsilon(V2)$ are tensile fracture elongation values at stress rates of V1 and V2.

(10) A thermoplastic resin composition, according to any one of (1) through (9), wherein JIS No. 1 strip specimens (10 mm wide, 80 mm long and 4 mm thick) produced by injection-molding the resin composition have a deflection temperature under load of 50° C. or higher at 0.45 MPa; and when a cone with a mass of 193 kg is allowed to freely fall from a drop height of 0.5 m onto a cylinder with an outermost diameter of 50 mm, a wall thickness of 2 mm and a height of 150 mm obtained by molding the resin composition, the maximum point load acting on the cone is less than 20 kilonewtons, while cracks of 5 cm or more do not occur in the cylinder.

(11) A method for producing the thermoplastic resin composition as set forth in (1), in which the thermoplastic resin (A) and the reactive functional group-containing resin (B) are melt-kneaded by a twin-screw extruder of 50 or more in the ratio L/D0 of screw length L to screw diameter D0, wherein the screws of the twin-screw extruder have full flight zones and kneading zones at multiple places; and the melt kneading is performed at a condition of Pkmax≧Pfmin+0.3, where Pkmax (MPa) is the maximum resin pressure among the resin pressures in the kneading zones of the screws, and Pfmin (MPa) is the minimum resin pressure among the resin pressures in the full flight zones of the screws.

(12) A method for producing the thermoplastic resin composition, according to (11), wherein the melt kneading is performed under such conditions that the dwell time of the raw materials in the twin-screw extruder from their supply to extrusion is 1 minute to 30 minutes and that the extrusion rate per 1 rpm of the screws is 0.01 kg/h or more.

(13) A method for producing the thermoplastic resin composition, according to (11) or (12), wherein the screws of the twin-screw extruder are completely intermeshing screws rotating in the same direction.

(14) A method for producing the thermoplastic resin composition, according to any one of (11) through (13), wherein the total length of the kneading zones is equal to 5 to 50% of the screw length.

(15) A method for producing the thermoplastic resin composition, according to any one of (11) through (14), wherein the respective lengths Lk of the kneading zones satisfy Lk/D0=0.2 to 10.

(16) A method for producing the thermoplastic resin composition, according to any one of (11) through (15), wherein the twin-screw extruder has a vent vacuum zone; and the pressure in the vent vacuum zone is reduced to a gauge pressure of −0.07 MPa or less, when melt kneading is performed for production.

(17) A method for producing the thermoplastic resin composition, according to any one of (11) through (16), wherein raw materials with a water content of less than 5,000 ppm are used, when melt kneading is performed for production.

(18) A method for producing the thermoplastic resin composition, according to any one of (11) through (17), wherein the highest resin temperature is controlled at 180° C. to 330° C., when melt kneading is performed for production.

(19) A molded article produced by molding the thermoplastic resin composition as set forth in any one of (1) through (11) or the thermoplastic resin composition obtained by the production methods as set forth in any one of (11) through (18).

(20) A molded article, according to (19), wherein the molded article is at least one selected from films, sheets and fibers.

(21) A molded article, according to (19) or (20), wherein the molded article is at least one selected from automobile parts, architectural materials, sporting goods and electric and electronic parts.

(22) A molded article, according to any one of (19) through (21), wherein the molded article is an impact absorbing member.

We provide a thermoplastic resin composition excellent in the balance between contradictory properties such as impact resistance and heat resistance, capable of remarkably exhibiting a peculiar viscoelastic behavior not observed in the conventional polymeric materials, and remarkably excellent in impact energy absorbing performance and vibration energy absorbing performance at the time of high-speed deformation, by forming three-dimensionally connective structures containing a continuous phase component in the respective dispersed phase particles of a dispersed phase and controlling the rate of the area of the connective structures occupying the section of each dispersed phase particle of the dispersed phase in the case where the thermoplastic resin composition is a thermoplastic resin composition containing a reactive functional group-containing resin, or by controlling the relaxation time of a polyamide resin in the case where the thermoplastic resin composition is a thermoplastic resin composition containing the polyimide resin. In more detail, we provide a thermoplastic resin composition for impact absorbing members, which has sufficient heat resistance at room temperature, and allows only a low maximum load to act on the object protected by it and can absorb large energy without being fractured even when the thermoplastic resin composition is subjected to a large-load high-speed impact.

Figure 1:
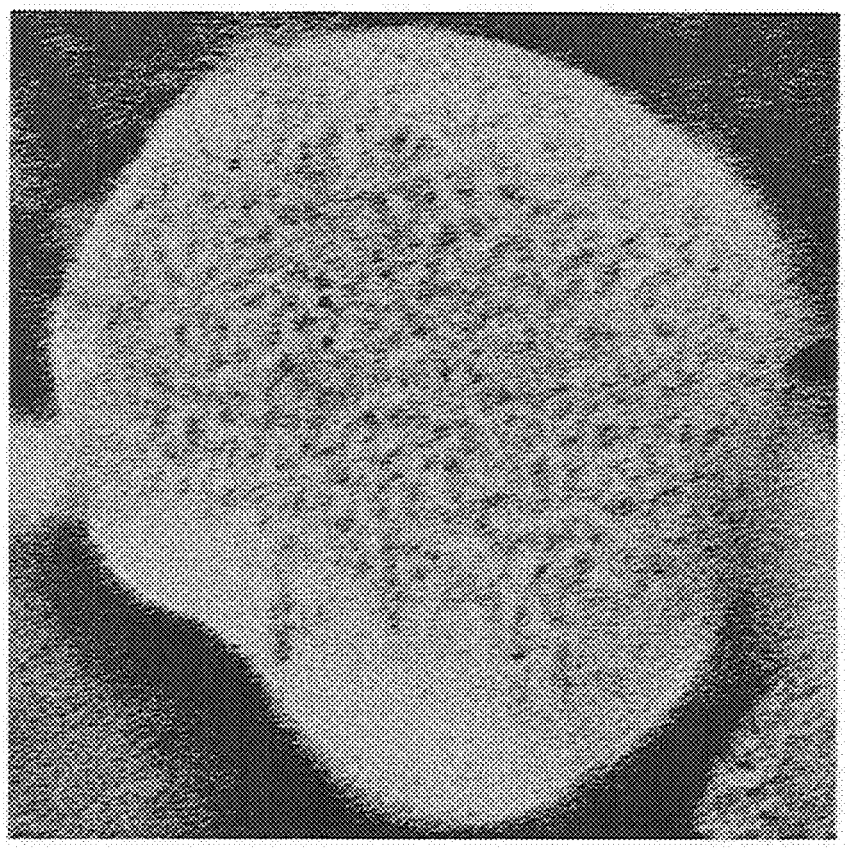
FIG. 1 is a photo showing a three-dimensional transmission image (50,000×, 250 nm×250 nm×75 nm) at an inclination angle of 0° in Example 1.

1 continuous phase
2 dispersed phase
3 connective structures
4 continuous phase
5 dispersed phase
6 connective structures
7 outermost diameter of molded cylinder
8 wall thickness of molded cylinder
9 height of molded cylinder

DETAILED DESCRIPTION

This disclosure is explained below in more detail.

The thermoplastic resin composition is a thermoplastic resin composition comprising a thermoplastic resin (A) and a reactive functional group-containing resin.

The thermoplastic resin (A) is a resin moldable by heat melting and is not especially limited. However, it is preferred that the thermoplastic resin is at least one thermoplastic resin selected, for example, from polyamide resins, polyester resins, polyphenylene sulfide resins, polyacetal resins, polyphenylene oxide resins, polycarbonate resins, polylactic acid resins, polysulfone resins, polyethylene tetrafluoride resins, polyetherimide resins, polyamideimide resins, polyimide resins, polyethersulfone resins, polyetherketone resins, polythioetherketone resins, polyetheretherketone resins, polyethylene resins, polypropylene resins, styrene-based resins such as polystyrene resins and ABS resins, rubber polymers, polyalkylene oxide resins, etc.

Among the abovementioned thermoplastic resins, preferably usable are polyamide resins, polyester resins, polyphenylene sulfide resins, polyacetal resins, styrene-based resins, polyphenylene oxide resins, polycarbonate resins, polylactic acid resins, and above all, most preferably usable are polyamide resins, polyester resins, and polyphenylene oxide resins, since they are high in the reactivity of end groups.

A polyamide resin refers to a resin composed of a polymer with amide bonds and is produced using an amino acid, lactam or diamine and a dicarboxylic acid as main raw materials. Typical examples of the raw materials include amino acids such as 6-aminocaproic acid, 11-aminoundecanoic acid, 12-aminododecanoic acid, and paraaminomethylbenzoic acid, lactams such as ε-caprolactam and ω-laurolactam, aliphatic, alicyclic and aromatic diamines such as tetramethylenediamine, hexamethylenediamine, 2-methylpentamethylenediamine, undecamethylenediamine, dodecamethylenediamine, 2,2,4-/2,4,4-trimethylhexamethylenediamine, 5-methylnonamethylenediamine, metaxylenediamine, paraxylenediamine, 1,3-bis(aminomethyl)cyclohexane, 1,4-bis (aminomethyl)cyclohexane, 1-amino-3-aminomethyl-3,5,5-trimethylcyclohexane, bis(4-aminocyclohexyl)methane, bis(3-methyl-4-aminocyclohexyl)methane, 2,2-bis(4-aminocyclohexyl)propane, bis(aminopropyl)piperazine, and aminoethylpiperazine, and aliphatic, alicyclic and aromatic dicarboxylic acids such as adipic acid, suberic acid, azelaic acid, sebacic acid, dodecane diacid, terephthalic acid, isophthalic acid, 2-chloroterephthalic acid, 2-methylterephthalic acid, 5-methylisophthalic acid, 5-sodiumsulfoisophthalic acid, hexahydroterephthalic acid, and hexahydroisophthalic acid. The polyamide homopolymers and copolymers derived from these raw materials can be used respectively alone or as a mixture.

Particular examples of the polyamide resins especially useful include polycaproamide (polyamide 6), polyhexamethyleneadipamide (polyamide 66), polyundecaneamide (polyamide 11), polydodecaneamide (polyamide 12), polytetramethyleneadipamide (polyamide 46), polyhexamethylenesebacamide (polyamide 610), polyhexamethylenedodecamide (polyamide 612), polyhexamethyleneadipamide/polyhexamethyleneterephthalamide copolymer (polyamide 66/6T), polyhexamethyleneadipamide/polyhexamethyleneisophthalamide copolymer (polyamide 66/6I), polyhexamethyleneadipamide/polyhexamethyleneterephthalamide/polyhexamethyleneisophthalamide copolymer (polyamide 66/6T/6I), polyxylyleneadipamide (polyamide XD6), their mixtures and copolymers, etc.

Especially preferred examples include polyamide 6, polyamide 66, polyamide 11, polyamide 12, polyamide 610, polyamide 6/66 copolymer, polyamide 6/12 copolymer, etc. Further, these polyamide resins can also be practically suitably used as mixtures in response to required properties such as moldability, heat resistance, toughness and surface properties. Among these polyamides, polyamide 6, polyamide 66, polyamide 11 and polyamide 12 are most preferred.

These polyamide resins are not especially limited in polymerization degree. It is preferred that the relative viscosity measured in 1% concentrated sulfuric acid solution at 25° C. is in a range from 1.5 to 5.0. An especially preferred range is 2.0 to 4.0.

Further, the polyester resin refers to a polymeric thermoplastic resin with ester bonds in the main chain. A homopolymer or copolymer obtained by condensation reaction with a dicarboxylic acid (or any of its eater formable derivatives) and a diol (or any of its ester formable derivatives) as main components, or their mixture is preferred.

Examples of the abovementioned dicarboxylic acid include aromatic dicarboxylic acids such as terephthalic acid, isophthalic acid, phthalic acid, 2,6-naphthalenedicarboxylic acid, 1,5-naphthalenedicarboxylic acid, bis(p-carboxyphenyl)methane, anthracenedicarboxylic acid, 4,4'-diphenyletherdicarboxylic acid, and 5-sodiumsulfoisophthalic acid, aliphatic dicarboxylic acids such as adipic acid, sebacic acid, azelaic acid and dodecanedioic acid, alicyclic dicarboxylic acids such as 1,3-cyclohexanedicarboxylic acid, and 1,4-cyclohexanedicarboxylic acid, their ester formable derivatives, etc. Examples of the diol component include aliphatic glycols with 2 to 20 carbon atoms, namely, ethylene glycol, propylene glycol, 1,4-butanediol, neopentyl glycol, 1,5-pentanediol, 1,6-hexanediol, decamethylene glycol, cyclohexanedimethanol, cyclohexanediol, etc., long-chain glycols of 400 to 6,000 in molecular weight, namely, polyethylene glycol, poly-1,3-propylene glycol, polytetramethylene glycol, etc., and their ester formable derivatives, etc.

Preferred examples of their homopolymers and copolymers include polybutylene terephthalate, polybutylene (terephthalate/isophthalate), polybutylene (terephthalate/adipate), polybutylene (terephthalate/sebacate), polybutylene (terephthalate/decanedicarboxylate), polybutylene naphthalate, polyethylene terephthalate, polyethylene (terephthalate/isophthalate), polyethylene (terephthalate/adipate), polyethylene (terephthalate/5-sodiumsulfoisophthalate), polybutylene (terephthalate/5-sodiumsulfoisophthalate), polyethylene naphthalate, polycyclohexanedimethylene terephthalate, etc. In view of moldability of the polyester composition, especially preferred are polybutylene terephthalate, polybutylene (terephthalate/adipate), polybutylene (terephthalate/decanedicarboxylate), polybutylene naphthalate, polyethylene terephthalate, polyethylene (terephthalate/adipate), polyethylene naphthalate, polycyclohexanedimethylene terephthalate, etc. Polybutylene terephthalate (polybutylene terephthalate resin) is most preferred.

Further, the intrinsic viscosity of polybutylene terephthalate resin measured using o-chlorophenol solvent at 25° C. is 0.36 to 1.60, and an especially suitable range is 0.52 to 1.25. Furthermore, polybutylene terephthalate resin with a different intrinsic viscosity can also be used together, and it is preferred that the intrinsic viscosity of the polybutylene terephthalate resin with a different intrinsic viscosity is also in a range from 0.36 to 1.60.

Moreover, it is preferred in view of durability and anisotropy inhibiting effect that the amount of COOH end groups of polybutylene terephthalate resin obtained by potentiometric titration of the m-cresol solution using an alkali solution is 1 to 50 eq/t (the amount of end groups per 1 ton of the polymer).

Further, the particular examples of the polyphenylene oxide resins include poly(2,6-dimethyl-1,4-phenylene oxide), poly(2-methyl-6-ethyl-1,4-phenylene oxide), poly(2,6-diphenyl-1,4-phenylene oxide), poly(2-methyl-6-phenyl-1,4-phenylene oxide), poly(2,6-dichloro-1,4-phenylene oxide), etc. Furthermore, copolymers such as a copolymer consisting of 2,6-dimethylphenol and another phenol (for example, 2,3,6-trimethylphenol) can also be used. Among them, preferred are poly(2,6-dimethyl-1,4-phenylene oxide), and a copolymer consisting of 2,6-dimethylphenol and 2,3,6-trimethylphenol. Poly(2,6-dimethyl-1,4-phenylene oxide) is especially preferred.

Moreover, suitable is a polyphenylene oxide resin, the reduced viscosity (0.5 g/dl chloroform solution) of which measured at 30° C. is in a range from 0.15 to 0.70.

The method for producing the polyphenylene oxide is not especially limited, and a polyphenylene oxide obtained by a publicly known method can be used. For example, the polyphenylene oxide resin can be easily produced by oxidation polymerization using, as a catalyst, the complex consisting of a cuprous salt and an amine described in U.S. Pat. No. 3,306,874 (Inventor: Hey).

The reactive functional group-containing resin (B) refers to a resin containing reactive functional groups in the molecular chains.

The resin as the base of the reactive functional group-containing resin (B) is a thermoplastic resin different from the aforementioned thermoplastic resin (A) and is not especially limited. Preferably the resin is at least one resin other than the aforementioned thermoplastic resin (A) selected from polyamide resins, polyester resins, polyphenylene sulfide resins, polyphenylene oxide resins, polycarbonate resins, polylactic acid resins, polysulfone resins, polyacetal resins polyethylene tetrafluoride resins, polyetherimide resins, polyamideimide resins, polyimide resins, polyethersulfone resins, polyetherketone resins, polythioetherketone resins, polyetheretherketone resins, polyethylene resins, polypropylene resins, polystyrene-based resins such as polystyrene resins and ABS resins, rubbery polymers, polyalkylene oxide resins, etc. As the base resin of the reactive functional group-containing resin (B), among them, polyethylene resins, polypropylene resins, styrene-based resins and rubbery polymers are more preferred in view of the easiness to introduce reactive functional groups. In view of impact resistance and toughness improving effect, rubbery polymers are more preferred.

A rubbery polymer generally contains a polymer with a glass transition temperature lower than room temperature, in which some of the molecules are bound to each other by covalent bonds, ionic bonds, van der Waals force, entanglement, etc. Preferred examples of the rubbery polymer include diene-based rubbers such as polybutadiene, polyisoprene, styrene-butadiene random copolymer and block copolymer, hydrogenation product of the block copolymer, acrylonitrile-butadiene copolymer, and butadiene-isoprene copolymer, ethylene-α-olefin copolymers such as ethylene-propylene random copolymer and block copolymer, and ethylene-butene random copolymer and block copolymer, ethylene-unsaturated carboxylic acid copolymers such as ethylene-acrylic acid, and ethylene-methacrylic acid, ethylene-unsaturated carboxylic acid ester copolymers such as ethylene-acrylic acid ester copolymers and ethylene methacrylic acid ester copolymers, ethylene-unsaturated carboxylic acid-unsaturated carboxylic acid metal salt copolymers such as ethylene-acrylic acid-metal acylate, and ethylene-methacrylic acid-metal methacrylate, respectively containing a meta salt as a part of the unsaturated carboxylic acid, acrylic acid ester-butadiene copolymers, acrylic elastic polymers such as butyl acrylate-butadiene copolymer, ethylene-fatty acid vinyl ester copolymers such as ethylene-vinyl acetate copolymer, ethylene-propylene-non-conjugated diene ternary copolymers such as ethylene-propylene-ethylidene norbornene, and ethylene-propylene-hexadiene copolymer, butylene-isoprene copolymer, chlorinated polyethylene, thermoplastic elastomers such as polyamide elastomers, and polyester elastomers, etc.

In the case where a polyamide resin is used as the thermoplastic resin (A), in view of compatibility, an ethylene-unsaturated carboxylic acid copolymer or ethylene-unsaturated carboxylic acid-unsaturated carboxylic acid metal salt copolymer can be preferably used among those enumerated above.

The unsaturated carboxylic acid ester in the ethylene-unsaturated carboxylic acid ester copolymer is a (meth)acrylic acid ester, preferably, an ester obtained from (meth)acrylic acid and an alcohol. Particular, examples of the unsaturated carboxylic acid ester include (meth)acrylic acid esters such as methyl (meth)acrylate, ethyl (meth)acrylate, 2-ethylhexyl (meth)acrylate, and stearyl (meth)acrylate.

The ratio by weight of the ethylene component and the unsaturated carboxylic acid ester component in the copolymer is not especially limited. A preferred ratio range is 90/10 to 10/90, and a more preferred range is 85/15 to 15/85.

The number average molecular weight of the ethylene-unsaturated carboxylic acid ester copolymer is not especially limited, but in view of flowability and mechanical properties, a range from 1,000 to 70,000 is preferred.

Particular examples of the unsaturated carboxylic acid in the ethylene-unsaturated carboxylic acid-unsaturated carboxylic acid metal salt copolymers include (meth)acrylic acid, etc. Examples of the unsaturated carboxylic acid metal salt include (meth)acrylic acid metal salts, etc. The metal of the unsaturated carboxylic acid metal salt is not especially limited, but preferred are alkali metals such as sodium, alkaline earth metal such as magnesium, zinc, etc.

The ratio by weight of the unsaturated carboxylic acid component and the unsaturated carboxylic acid metal salt component in the ethylene-unsaturated carboxylic acid-unsaturated carboxylic acid metal salt copolymer is not especially limited. A preferred ratio range is 95/5 to 5/95, and a more preferred range is 90/10 to 10/90.

The number average molecular weight of the ethylene-unsaturated carboxylic acid-unsaturated carboxylic acid metal salt copolymer is not especially limited, but in view of flowability and mechanical properties, a range from 1,000 to 70,000 is preferred.

The reactive functional groups contained in the reactive functional group-containing resin (B) are not especially limited, if they react with the end groups existing in the thermoplastic resin (A). It is preferred that the reactive functional groups are at least one type selected from amino groups, carboxyl groups carboxyl metal salt, hydroxyl groups, acid anhydride groups, epoxy groups, isocyanate groups, mercapto groups, oxazoline groups, sulfonic acid groups, etc. Among them, amino groups, carboxyl groups, carboxyl metal salt, epoxy groups, acid anhydride groups and oxazoline groups can be more preferably used, since they have higher reactivity and accompany few side reactions such as decomposition and crosslinking.

In the case where acid anhydride groups are introduced into a rubbery polymer, the method is not especially limited and a publicly known technique can be used. For example, a method in which an acid anhydride such as maleic anhydride, itaconic anhydride, endic anhydride, citraconic anhydride or 1-butene-3,4-dicarboxylic anhydride and monomers as raw materials of a rubbery polymer are copolymerized, or a method n which an acid anhydride is grafted to a rubber polymer, can be used.

Further, in the case where epoxy groups are introduced into a rubbery polymer, the method is not especially limited and a publicly known technique can be used. For example, a method in which a vinyl-based monomer with an epoxy group, for example, an α,β-unsaturated acid glycidyl ester compound such as glycidyl acrylate, glycidyl methacrylate, glycidyl ethacrylate, or glycidyl itaconate is copolymerized with monomers as raw materials of a rubbery polymer, a method in which a polymerization initiator or chain transfer agent containing any of the abovementioned types of functional groups is used for polymerization to produce a rubbery polymer, a method in which an epoxy compound is grafted to a rubbery polymer, can be used.

Further, in the case where oxazoline groups are introduced into a rubbery polymer, the method is not especially limited, and a publicly known technique can be used. For example, a method in which a vinyl-based monomer with an oxazoline group such as 2-isopropenyl-oxasoline, 2-vinyl-oxazoline, 2-acroyl-oxazoline or 2-styryl-oxazoline is copolymerized with monomers as raw materials of a rubbery polymer, etc. can be used.

The number of functional groups per one molecular chain in the reactive functional group-containing resin (B) is not especially limited, but it is preferred that the number is usually 1 to 10. For decreasing the side reactions such as crosslinking, it is preferred that the number is 1 to 5. Further, molecules not containing the functional group at all can also be contained, but it is preferred that the rate of the molecules not containing the functional group at all is small.

The mixing ratio of the thermoplastic resin (A) and the reactive functional group-containing resin (B) is not especially limited, but it is preferred that the ratio $Aw/Bw$ of the weight $Aw$ of the thermoplastic resin (A) to the weight $Bw$ of the reactive functional group-containing resin (B) is in a range from 5/95 to 95/5. A more preferred range is 10/90 to 90/10, and the most preferred range is from 15/85 to 85/15. It is not preferred that $Aw/Bw$ is lower than 5/95, since the reaction between the molecules of the reactive functional group-containing resin (B) becomes remarkable to increase the viscosity for making molding work difficult. It is not preferred either that $Aw/Bw$ is more than 95/5, since the amount of the functional groups reacting with the thermoplastic resin (A) decreases, resulting in a tendency to lower the effect of improving the mechanical properties of the thermoplastic resin composition and the effect of exhibiting the peculiar viscoelastic behavior.

The structure of the thermoplastic resin composition is observed by transmission electron microscopy tomography (TEMT). The TEMT is to apply computer tomography (CT method) to transmission electron microscopy (TEM), and this microscopy three-dimensionally visualizes the structure inside a material on the nanometer scale. The TEM is a technique for obtaining the transmission electron beam image of a sample, and this technique is used to obtain numerous transmission images by inclining the sample relatively to the electron beam. The TEMT is a method for re-constituting the series of the transmission images by the CT method, to obtain a three-dimensional image.

The experimental method for obtaining a three-dimensional image by the TEMT is not especially limited, but a typical example is described below. Like a sample prepared for the observation with two-dimensional TEM, a thin slice (sample) of a thermoplastic resin composition is prepared by a publicly known technique and is dyed with an appropriate dyeing agent, to obtain a sample, or a thermoplastic resin composition is dyed and subsequently sliced to obtain a sample. The sample is set in a three-dimensional electron microscope (for example, JEM-2200FS produced by JEOL), and for example, at steps of 1° within an inclination angle range from −60° to +60°, the sample is inclined to obtain transmission images. Thus, 121 transmission images can be obtained by inclining the sample. Before taking each image, gold particles with a diameter of about 10 nm are scattered on the surface of the sample, and the movement of the gold particles caused by inclination is traced to correct the inclination axis for the transmission images. From the series of transmission images obtained in reference to the inclination axis, three-dimensional data is re-constituted to obtain a three-dimensional transmission image.

In the thermoplastic resin composition, either the thermoplastic resin (A) or the reactive functional group-containing resin (B) forms a continuous phase, and the other resin forms a dispersed phase. The resin forming the continuous phase is either the thermoplastic resin (A) or the reactive functional group-containing resin (B) and is not especially limited, but if the properties of the thermoplastic resin (A) are mainly required, it is preferred that the continuous phase is formed by the thermoplastic resin (A).

In the thermoplastic resin composition, three-dimensionally connective structures Cs containing a continuous phase component are formed in the respective dispersed phase particles of the dispersed phase. The three-dimensionally connective structures referred to here are connective structures confirmed in the three-dimensional transmission image obtained by the TEMT. It is only required that the connective structures are structures in which particles are connected three-dimensionally, without existing individually separately, and the structures can be column-shaped, T-shaped, cross-shaped, network-shaped or the like.

In the thermoplastic resin composition, the rate of the area of the connective structures Cs occupying the section of each dispersed phase particle Dp with an average particle size of 1,000 nm or less of the dispersed phase is 10% or more. The average particle referred to here can be calculated by analyzing the transmission image obtained by the TEMT at an inclination angle of 0°. For the image analysis, a piece of image analysis software such as "Scion Image" produced by Scion Corporation is used to calculate the mean value of the diameters and the minor axes of the dispersed phase particles existing in the transmission image. The calculated mean value of the diameters and the minor axes is the average particle size.

In the thermoplastic resin composition, the three-dimensionally connective structures Cs containing a continuous phase component are formed in the respective dispersed phase particles of the dispersed phase as described below. That is, when the thermoplastic resin composition is produced, either the thermoplastic resin (A) or the reactive functional group-containing resin (B) forms a continuous phase, while the other resin forms a dispersed phase, and the thermoplastic resin (A) and the reactive functional group-containing resin (B) react with each other at the interfaces between the continuous phase and the dispersed phase particles. As the reaction at the interfaces progresses, the amount of the reaction product increases, and the reaction product produced at the interfaces is drawn into the dispersed phase particles. If the reaction further progresses, the amount of the reaction product drawn into the dispersed phase particles increases, and the molecules of the reaction product are connected with each other to form three-dimensionally connective structures in the respective dispersed phase particles. Furthermore, the reaction product produced by the reaction at the interfaces acts as a surfactant, to make the dispersed phase particles finer, for prevent the dispersed phase particles from joining together and growing, thus stabilizing the dispersed state. As described above, the reaction between the thermoplastic resin (A) and the reactive functional group-containing resin (B) progresses to form three-dimensionally connective structures Cs containing a continuous phase component in the respective dispersed phase particles of the dispersed phase, and in the case where the rate of the area of the connective structures Cs occupying the section of each dispersed phase particle Dp with an average particle size of 1,000 nm or less becomes 10% or more, preferably 15% or more, most preferably 20% or more, the peculiar viscoelastic behavior as an effect can be remarkably exhibited. Thus the effect that the impact energy absorbing performance and the vibration energy absorbing performance at the time of high-speed deformation becomes remarkably excellent can be exhibited. Further, it is desirable that the rate of the area of the connective structures Cs occupying the section of each dispersed phase particle Dp with an average particle size of 800 nm or less is 10% or more, preferably 15% or more, most preferably 20% or more, and it is more desirable that the rate of the area of the connective structures Cs occupying the section of each dispersed phase particle Dp with an average particle size of 500 nm or less is 10% or more, preferably 15% or more, most preferably 20% or more. The section of each dispersed phase particle Dp of the dispersed phase referred to here is a section on the transmission image obtained by the TEMT at an inclination angle of 0°. The method for calculating the rate of the area of the connective structures Cs occupying the section of each dispersed phase particle Dp of the dispersed phase is not especially limited. Any appropriate dyeing agent can be used to dye either the dispersed phase or the continuous phase, to obtain a color contrast between the dispersed phase and the continuous phase in the transmission image, for distinguishing the dispersed phase from the continuous phase. Therefore, the connective structures Cs containing the continuous phase component can also have a color contrast to the dispersed phase. The portion different in color from each dispersed phase particle Dp in the section of the dispersed phase particle Dp can be defined as the section of the connective structures Cs containing the continuous phase component, and the value obtained by dividing the sectional area of the connective structures Cs containing the continuous phase component by the sectional area of each dispersed phase particle Dp is the rate of the area of the connective structures Cs occupying the section of each dispersed phase particle Dp. The method for calculating the area is not especially limited, but for example, a piece of image analysis software such as the aforementioned "Scion Image" produced by Scion Corporation can be used for calculating the area.

Further, in the thermoplastic resin composition containing a polyamide resin, as the polyamide resin (A1), any of the abovementioned polyamide resins can be suitably used, and as the reactive functional group-containing resin (B), any of the abovementioned reactive functional group-containing resins (B) can be suitably used.

In the case where the thermoplastic resin composition containing a polyamide resin contains the reactive functional group-containing resin (B), the mixing ratio between the polyamide resin (A1) and the reactive functional group-containing resin (B) is not especially limited, but it is preferred that the ratio Aw/Bw of the weight Aw of the polyamide resin (A1) to the weight Bw of the reactive functional group-containing resin (B) is in a range from 5/95 to 95/5. A more preferred range is 10/90 to 90/10, and the most preferred range is 15/85 to 85/15. It is not preferred that Aw/Bw is less than 5/95, since the reaction between the molecules of the reactive functional group-containing resin (B) becomes remarkable to increase the viscosity, resulting in a tendency to make molding work difficult. It is not preferred either that Aw/Bw is more than 95/5, since the amount of functional groups reacting with the polyamide resin (A1) decreases, resulting in a tendency to lower the effect of improving the mechanical, properties of the thermoplastic resin composition and the effect of exhibiting the peculiar viscoelastic behavior.

Further, the thermoplastic resin composition containing a polyamide resin can contain a further other thermoplastic resin (C) in addition to the polyamide resin (A1) and the reactive functional group-containing resin (B).

The other thermoplastic resin (C) that can be contained in the thermoplastic resin composition is not especially limited, and the thermoplastic resin (C) can, be preferably at least one thermoplastic resin selected, for example, from polyester resins, polyphenylene sulfide resins, polyacetal resins, polyphenylene oxide resins, polycarbonate resins, polylactic acid resins, polysulfone resins, polyethylene tetrafluoride resins, polyetherimide resins, polyamideimide resins, polyimide resins, polyethersulfone resins, polyetherketone resins, polythioetherketone resins, polyetheretherketone resins, polyethylene resins, polypropylene resins, styrene-based resins such as polystyrene resins and ABS resins, rubbery polymers, polyalkylene oxide resins, etc.

Among the abovementioned thermoplastic resins, preferably used are polyester resins, polyphenylene sulfide resins, polyacetal resins, styrene-based resins, polyphenylene oxide resins, polycarbonate resins and polylactic acid resins.

In the case where the thermoplastic resin composition containing a polyamide resin contains the other thermoplastic resin (C), the mixing ratio between the polyamide resin (A1) and the other thermoplastic resin (C) is not especially limited. However, it is preferred that the ratio Aw/Cw of the weight Aw of the polyamide resin (A1) to the weight Cw of the other thermoplastic resin (C) is in a range from 1/99 to 99/1. A more preferred range is 3/97 to 97/3, and the most preferred range is 5/95 to 95/5.

In the relaxation time T1C of each carbon nucleus by solid NMR measurement of the thermoplastic resin composition containing a polyamide resin, the longer relaxation time T1C1 among the two relaxation times in the two-component analysis of the relaxation time corresponding to the carbon of each carbonyl group of the polyamide resin (A1) is 65 seconds or less, while the longer relaxation time T1C2 among the two relaxation times in the two-component analysis of the relaxation time corresponding to the carbon of the hydrocarbon group adjacent to each NH group of the polyamide resin (A1) is 15 seconds or less. In this case, the carbon of the hydrocarbon group adjacent to each NH group is the carbon of the aliphatic hydrocarbon group, alicyclic hydrocarbon group or aromatic hydrocarbon group adjacent to each NH group of the polyamide resin, or the carbon adjacent to the NH group constituting each end amino group or the carbon adjacent to the NH group constituting each amide group on the side opposite to the carbonyl group. The solid NMR measurement of the thermoplastic resin composition is performed by the following method. A solid NMR sample tube is filled at its center with the pellets of the thermoplastic resin composition, and is set in a solid NMR measuring instrument (for example, CMX-300 Infinity produced by Chemagnetics), to measure the relaxation time T1C of each carbon nucleus by Torchia method at room temperature using 13 C as the observation nucleus at an observation frequency of 75.2 MHz and a pulse width of 4.5 μs.

In the solid NMR measurement of the thermoplastic resin composition containing a polyamide resin, obtained are the longer relaxation time among the two relaxation times in the two-component analysis of the relaxation time corresponding to the carbon of each carbonyl group of the polyamide resin (A1) and the longer relaxation time among the two relaxation times in the two-component analysis of the relaxation time corresponding the carbon of the hydrocarbon group adjacent to each carbonyl group. The peaks corresponding to the carbon of each carbonyl group of a polyamide resin (A1) and the carbon of hydrocarbon group adjacent to each NH group are different, depending on the polyamide resin (A1) concerned. For example, in the case where polyamide 6 is used as the polyamide resin (A1), the peak corresponding to the carbon of each carbonyl group is 174 ppm, and the peak corresponding to the carbon of the hydrocarbon group adjacent to each NH group is 42 ppm. The two relaxation times in two-component analysis are a long relaxation time T1C component and a short relaxation, time T1C component, and the long relaxation time T1C component reflects the component with low molecular motility such as crystals while the short relaxation time T1C component reflects the component with high molecular motility such as an amorphous substance. Among the two relaxation times in the two-component analysis of the relaxation time corresponding to the carbon of each carbonyl group, the longer relaxation time is called T1C1, and among the two relaxation times in the two-component analysis of the relaxation time corresponding to the carbon of the hydrocarbon group adjacent to each NH group is called T1C2.

The relaxation time T1C of each carbon nucleus by solid NMR measurement refers to a value reflecting the molecular motility peculiar to each carbon, and a shorter relaxation time means higher molecular motility. In the thermoplastic resin composition, among the two relaxation times in the two-component analysis of the relaxation corresponding to each of two carbons (the carbon of each carbonyl group and the carbon of the hydrocarbon group adjacent to each NH group) constituting the ends of a polyamide out of the carbons constituting the polyamide, the longer relaxation time, namely, the relaxation time of the component with low molecular motility such as crystals is shortened (the molecular motility is enhanced) to remarkably exhibit the peculiar viscoelastic behavior as an effect and to exhibit an effect that the impact energy absorbing performance and the vibration energy absorbing performance at the time of high-speed deformation become remarkably excellent.

Further, the longer relaxation time in the two-component analysis of the relaxation time corresponding to the carbon of each carbonyl group and the longer relaxation time in the two-component analysis of the relaxation time corresponding to the carbon of the hydrocarbon group adjacent to each NH group are respectively about 140 seconds and about 90 seconds. In the case of a conventional resin composition obtained by kneading a polyamide resin and a reactive functional group-containing resin, since the polyamide resin and the reactive functional group-containing resin partially react with each other, the relaxation times tend to be rather shorter, being respectively about 68 seconds to about 86 seconds and about 19 seconds to about 35 seconds. The reason is considered to be that the molecular motility of the polyamide resin is affected and enhanced by the reactive functional group-containing resin higher in molecular motility than the polyamide resin.

The thermoplastic resin composition is produced, for example, by the production method described later. Therefore, compared with a conventional resin composition obtained by kneading a polyamide resin and a reactive functional group-containing resin, the reaction progresses to form a structure in which the polyamide component is incorporated not only at the interfaces between the polyamide resin and the reactive functional group-containing resin but also inside the dispersion structure of the reactive functional group-containing resin. This is considered to be the reason why the phenomenon that the relaxation time corresponding to the carbon adjacent to each NH group of the polyamide becomes very short (the molecular motility of the polyamide resin is highly enhanced) occurs.

Among the two relaxation times in the two-component analysis of the relaxation time corresponding to the carbon of each carbonyl group of the polyamide resin (A1), the longer relaxation time T1C1 is 65 seconds or less, preferably 63 seconds or less, more preferably 60 seconds or less. Further, among the two relaxation times in the two-component analysis of the relaxation time corresponding to the carbon of the hydrocarbon group adjacent to each NH group of the polyamide resin (A), the longer relaxation time T1C2 is 15 seconds or less, preferably 14 seconds or less, more preferably 13 seconds or less.

In the case where the thermoplastic resin composition containing a polyamide resin contains a reactive functional group-containing resin (B), it is preferred that either of the polyamide resin (A1) or the reactive functional group-containing resin (B) forms a continuous phase while the other resin forms a dispersed phase. The resin forming the continuous phase is either the polyamide resin (A1) or the reactive, functional group-containing resin (B) and is not especially limited. However, if the properties of the polyamide resin (A1) are mainly required, it is preferred that the polyamide resin (A1) forms the continuous phase.

In the thermoplastic resin composition containing a polyamide resin, in the case where either the thermoplastic resin (A1) or the reactive functional group-containing resin (B) forms a continuous phase while the other resin forms a dispersed phase, it is preferred that other fine particles with an average particle size of 300 nm or less exist in the dispersed phase. The material constituting the fine particles is not especially limited, but a preferred example is a compound produced by the reaction between the thermoplastic resin (A1) and the reactive functional group-containing resin (B) at the interfaces between the continuous phase and the respective dispersed phase particles of the dispersed phase. In this case, the compound is affected by the external field such as shear field and migrates from the interfaces into the respective dispersed phase particles and exists as micelle in which the component with high affinity to the phase containing the migrating component turns toward outside.

The dispersion structure as described above can be confirmed, for example, by observation with a transmission electron microscope. The magnification at which the dispersion structure can be confirmed by observation with a transmission electron microscope is a magnification used for ordinary observation with a transmission electron microscope. The magnification depends on the size of the fine particles, but in this case, the magnification is in a range from 5,000× to 100,000×. Especially in the case where the size of the fine particles is 100 nm or less, a magnification in a range from 10,000× to 100,000× is used.

In the case where the fine particles exist in the respective dispersed phase particles, the average particle size of the dispersed phase particles is not especially limited, as far as the dispersed phase particles can contain the fine particles. However, in view of impact resistance, etc., it is preferred that the average particle size is 100 to 1,000 nm. A more preferred range is 100 to 800 nm, and a further more preferred range is 100 to 500 nm.

It is preferred that the average particle size of the fine particles with an average particle size of 300 nm or less is 1 to 300 nm. A more preferred range is 3 to 100 nm, and a further more preferred range is 5 to 50 nm. The average particle size of the fine particles referred to here can be calculated by the image analysis of the transmission image obtained by observation with a transmission electron microscope. For the image analysis, a piece of image analysis software such as "Scion Image" produced by Scion Corporation can be used to calculate the mean value of the diameters and minor axes of the fine particles existing in the transmission image. The calculated mean value of the diameters and the minor axes is the average particle size.

Further, in the case where fine particles exist in the dispersed phase particles, it is preferred that the rate of the area of the fine particles occupying each of the dispersed phase particles is 10% or more, for remarkably exhibiting the peculiar viscoelastic behavior. More preferred is 15% or more, and further more preferred is 20% or more. The rate of the area of the fine particles occupying each of the dispersed phase particles referred to here can be calculated by the image analysis of the transmission image obtained by observation with a transmission electron microscope. For the image analysis, a piece of image analysis software such as "Scion Image" produced by Scion Corporation can be used to calculate the area of each of the dispersed phase particles existing in the transmission image and the area of the fine particles existing in the dispersed phase particle concerned, and the area of the fine particles existing in the dispersed phase particle is divided by the area of the dispersed phase particle, to calculate the rate of the area of the fine particles occupying the dispersed phase particle.

In the case where JIS-5A dumbbell specimens (75 mm long, 12.5 mm wide at ends and 2 mm thick) are produced from the thermoplastic resin composition by injection molding and where the specimens are tensile-tested, it is preferred that the specimens have a property of $E(V1) > E(V2)$, if $V1 < V2$, where $E(V1)$ and $E(V2)$ are tensile elastic modulus values at stress rates of V1 and V2. The tensile test in this case is performed according to the method specified in the standard. The tensile elastic modulus refers to the gradient of the initial straight portion in the stress-strain curve.

Further, when the thermoplastic resin composition is tensile-tested, it is preferred that the thermoplastic resin composition satisfies $\epsilon(V1) < \epsilon(V2)$, if $V1 < V2$, where $\epsilon(V1)$ and $\epsilon(V2)$ are tensile fracture elongation values at stress rates of V1 and V2. The tensile fracture elongation refers to the elongation at the moment of fracture. It is preferred that the abovementioned relationship holds for all the V1 and V2 values in a stress rate range from 10 mm/min to 500 mm/min, and it is more preferred that the abovementioned relationship holds for all the V1 and V2 values in a stress rate range from 1 mm/min to 1,000 mm/min.

As the method for producing the thermoplastic resin composition, for example, production in a molten state and production in a solution state can be used. In view of higher reactivity, the production in a molten state can be preferably used. For the production in a molten state, the melt kneading by an extruder, the melt kneading by a kneader, and the like can be used, but in view of productivity, the melt kneading by an extruder that allows continuous production can be preferably used. For the melt kneading by an extruder, one or more extruders, for example, a single-screw extruder, multi-screw extruder such as twin-screw extruder or four-screw extruder or single-screw/twin-screw combined extruder can be used. However, in view of kneadability, reactivity and productivity, a multi-screw extruder such as a twin-screw extruder or four-screw extruder can be preferably used, and the method of melt-kneading using a twin-screw extruder is most preferred.

In the case where a twin extruder is used for producing a thermoplastic resin composition, in view of higher kneadability and reactivity, it is preferred that the value of L/D0 is 50 or more, though L/D0 is not especially limited to this value. A more preferred range of the value L/D0 is 60 to 200, and a further more preferred range is 80 to 200. The L/D0 refers to the value obtained by dividing the screw length L by the screw diameter D0. The screw length refers to the length from the upstream end of the screw segment at the position (feed port) for feeding raw materials at the root of the screw to the tip of the screw. The screws of a twin-screw extruder consist of screw segments different in length and shape such as full flights and kneading discs. In an extruder, the side on which raw materials are supplied may be called "upstream," while the side on which a molten resin is discharged may be called "downstream."

Meanwhile, in the case where sampling is performed at an intermediate portion of an extruder with a sampling valve, etc., the screw length L can be considered to be equal to "the length from the upstream end of the screw segment at the position (feed port) for feeding raw materials at the root of the screw to the sampling place," and the sample can be considered to be equivalent to a molten resin obtained by kneading in an ordinary extruder in which the screw diameter D0 is equal to the screw diameter of the extruder with a sampling valve, etc. The sampling place referred to here is the position that is nearest to the port where the resin in the cylinder is discharged and is on the screw axes on the upstream side.

In the case where a twin-screw extruder is used for producing a thermoplastic resin composition, in view of higher kneadability and reactivity, it is preferred that the screws of the twin-screw extruder have full flight zones and kneading zones at multiple places. Each full flight zone consists of one or more full flights, and each kneading zone consists of one or more kneading discs.

In the case where a twin-screw extruder is used for producing a thermoplastic resin composition, if the resin pressure of the kneading zone showing the maximum resin pressure among the resin pressures indicated by the resin pressure gauges installed in the kneading zones established at multiple places is Pkmax (MPa) and if the resin pressure of the full flight zone showing the minimum resin pressure among the resin pressures indicated by the resin pressure gauges installed in the full flight zones established at multiple places is Pfmin (MPa), then it is preferred that the thermoplastic resin composition is produced under the condition that the value of Pkmax is (Pfmin+0.3) or larger. A more preferred condition is that the value of Pkmax is (Pfmin+0.4) or larger, and a further more preferred condition is that the value of Pkmax is (Pfmin+0.5) or larger.

A kneading zone consisting of one or more kneading discs is more excellent than a full flight zone consisting of one or more full flights in the molten resin kneadability and reactivity. If the kneading zones are saturated with the molten resin, kneadability and reactivity can be dramatically enhanced. One indicator indicating the state of saturation with the molten resin is the value of the resin pressure, and a larger resin pressure can be considered to indicate that each kneading zone is more saturated with the molten resin. That is, in the case where a twin-screw extruder is used for producing the thermoplastic resin composition, if the resin pressures of the kneading zones are made higher than the resin pressures of the full flight zones to certain extent, the reaction can be effectively promoted, and the formation of the three-dimensionally connective structures Cs containing the continuous phase component in the respective dispersed phase particles of the dispersed phase is promoted. Further, in the thermoplastic resin composition containing a polyamide resin, the relaxation time corresponding to the carbon of each carbonyl group of the polyamide resin or the carbon of the hydrocarbon group adjacent to each $NH_2$ group can be kept in the aforementioned range, to allow the peculiar viscoelastic behavior to be remarkably exhibited.

The method for enhancing the resin pressures of the kneading zones is not especially limited, and for example, a method in which a reverse screw region with an effect of pressing back the molten resin toward the upstream side or a seal ring region with an effect of retaining the molten resin is introduced between the respectively adjacent kneading zones or on the downstream side in each kneading zone can be preferably used. A reverse screw region consists of one or more reverse screws, and a seal ring region consists of one or more seal rings, and they can also be used in combination.

For example, in the case where a reverse screw region is introduced between the respectively adjacent kneading zones or on the downstream size in each kneading zone, it is preferred in view of kneadability and reactivity that every reverse screw region has a length of $Lr/D0=0.1$ to 10, where Lr is the length of each reverse screw region. A more preferred range of length $Lr/D0$ of each reverse screw region is 0.2 to 8, and a further more preferred range is 0.3 to 6. Meanwhile, the length Lr of each reverse screw region refers to the distance between the perpendicular from the upstream end of the most upstream screw in the reverse screw region to the center line of the screw axis and the perpendicular from the downstream end of the most downstream reverse screw in the reverse screw region to the center line of the screw axis.

Further, in the case where a twin-screw extruder is used for producing a thermoplastic resin composition, it is preferred that the extrusion rate of the thermoplastic resin composition is 0.01 kg/h or more per 1 rpm of the screws. A more preferred range is 0.05 kg/h to 1 kg/h, and a further more preferred range is 0.08 to 0.5 kg/h. The most preferred range is 0.1 to 0.3 kg/h. The extrusion rate referred to here is the extrusion rate of the thermoplastic resin composition discharged from the extruder, namely, the weight (kg) extruded per 1 hour.

Meanwhile, the preferred numerical range for the extrusion rate of the abovementioned twin-screw extruder is that of a twin-screw extruder with a screw diameter of 37 mm. In the case where the screw diameter is greatly different, for example, in the case where a twin-screw extruder with a diameter of less than 30 mm or a diameter of more than 50 mm is used, the extrusion rate should be decreased or increased to suit the scale of the screws, preferably changed according to the $2.5^{th}$ power law or the $3.5^{th}$ power law for the screw diameter ratio of the actually used screw diameter to the reference screw diameter or for the screw diameter ratio of the reference screw diameter to the actually used screw diameter, more preferably according to the $2.5^{th}$ power law.

For example, in the case where a twin-screw extruder with a screw diameter of 20 mm is used, if the extrusion rate is changed according to the $2.5^{th}$ power law for the screw diameter ratio of the actually used screw diameter to the reference screw diameter, the extrusion rate of the thermoplastic resin composition is 0.02 kg/h or more per 1 rpm screw rotation speed, more preferably 0.01 to 0.2 kg/h, further more preferably 0.017 to 0.11 kg/h, and most preferably 0.02 to 0.06 kg/h.

Further, in the case where a twin-screw extruder with a screw diameter of 100 mm is used, if the extrusion rate is changed according to the $2.5^{th}$ power law for the screw diameter ratio of the reference screw diameter to the actually used screw diameter, the extrusion rate of the thermoplastic resin composition is preferably 0.12 kg/hr or more per 1 rpm screw rotation speed, more preferably 0.6 to 12 kg/h, further more preferably 0.96 to 6 kg/h, most preferably 1.2 to 3.6 kg/h.

Furthermore, the rotating speed of the screws is not especially limited, but is usually 10 rpm or more, preferably 15 rpm or more, more preferably 20 rpm or more. Moreover, the extrusion rate is not especially limited, but is usually 0.1 kg/h or more, preferably 0.15 kg/h or more, more preferably 0.2 kg/h or more.

Further, in the case where a twin-screw extruder is used for producing a thermoplastic resin composition, it is preferred that the dwell time of the thermoplastic resin composition in the twin-screw extruder is 1 to 30 minutes. A more preferred range is 1.5 to 28 minutes, and a further more preferred range is 2 to 25 minutes. The dwell time referred to here is the average of the dwell times from the moment when the raw materials are supplied to the twin-screw extruder till the moment when the thermoplastic resin composition is discharged and is the period of time from the moment when the raw materials and usually about 1 g of a colorant are supplied together from the raw material supply position at the roots of the screws till the moment when the thermoplastic resin composition is extruded from the discharge port of the extruder with the extruded composition colored by the colorant to the maximum extent, in such a steady melt kneading state that a colorless thermoplastic resin composition is adjusted to be extruded at a predetermined rate.

Furthermore, in the case where a twin-screw extruder is used for producing a thermoplastic resin composition, the screws of the twin-screw extruder are not especially limited and completely intermeshing screws, incompletely intermeshing screws, non-intermeshing screws, etc. can be used. However, in view of kneadability and reactivity, completely intermeshing screws are preferred. As for the rotating directions of the screws, the screws can rotate in the same direction or in different directions, but in view of kneadability and reactivity, screws rotating in the same direction are preferred. In the case where a twin-screw extruder is used, completely intermeshing screws rotating in the same direction are most preferred.

Moreover, in the case where a twin-screw extruder is used, as the screw constitution of the twin-screw extruder, full flights and/or kneading discs are used in combination, and a screw constitution for effectively applying a shear field to the molten thermoplastic resin composition is preferred. For this reason, as described before, it is preferred that the screws of the twin-screw extruder have kneading zones, each consisting of one or more kneading discs, at multiple places in the longitudinal direction. It is preferred that the total length of these kneading zones corresponds to 5 to 50% of the entire length of the screws. A more preferred range is 10 to 40%, and a further more preferred range is 15 to 30%.

Further, in the case where a twin-screw extruder is used, if the length of each kneading zone in the screws of the twin-screw extruder is Lk, it is preferred in view of kneadability and reactivity that every kneading zone has a length of Lk/D0=0.2 to 10. A more preferred range of the length Lk/D0 of each kneading zone is 0.3 to 9, and a further more preferred range is 0.5 to 8. Meanwhile, the length Lk of each kneading zone refers to the distance between the perpendicular from the upstream end of the most upstream kneading disc of the kneading zone to the center line of the screw axis and the perpendicular from the downstream end of the most downstream kneading disc of the kneading zone.

In the case where a twin-screw extruder is used, it is preferred that the kneading zones of the twin-screw extruder are arranged evenly in the entire range without existing locally in specific positions within the screws.

In the case where a twin-screw extruder is used, to remove reaction byproducts, thermally deteriorated materials or the like, it is preferred to establish a vent vacuum zone for reducing the pressure to a gauge pressure of −0.07 MPa or less for performing melt kneading. It is more preferred to reduce the pressure to a gauge pressure of −0.08 MPa or less for performing melt kneading. In this case, the gauge pressure refers to the pressure with the atmospheric pressure as zero, and a lower pressure shows a higher vacuum degree and a higher capability to remove the volatile component. It is not preferred that the gauge pressure in the vent vacuum zone is higher than −0.07 MPa, namely, that the vacuum degree is low, since the abovementioned volatile component cannot be sufficiently removed, causing impurities to remain in the thermoplastic resin composition, thus lowering impact absorbability. If the volatile component is sufficiently removed in the vent vacuum zone, the amount of impurities in the thermoplastic resin composition can be decreased, allowing impact absorbability to be exhibited remarkably. The number of the vent vacuum zones is not especially limited, and it is preferred to establish one to multiple vent vacuum zones. Further, the position of the vent vacuum zone is not especially limited, but it is preferred that at least one vent vacuum zone is established at the position upstream of the sampling position by L/D0=0 to 10, since the volatile component can be effectively removed.

In the case where a twin-screw extruder is used, it is preferred to use raw materials with a water content of less than 5,000 ppm for performing melt kneading. It is more preferred to use raw materials with a water content of less than 1,000 ppm for performing melt kneading. The water content referred to here is measured according to ISO15512. It is not preferred to use raw materials with a water content of more than 5,000 ppm, since the water contained in the raw materials inhibits the reaction in the extruder and impairs the kneadability, to lower the impact absorbability of the produced thermoplastic resin composition. Further, the use of raw materials with a water content of more than 5,000 ppm is not preferred either, since in the case where the thermoplastic resin (A) is a polyester resin, hydrolysis further progresses in the extruder, to greatly lower the impact absorbability of the produced thermoplastic resin composition.

In the case where a twin-screw extruder is used, it is preferred to perform melt-kneading with the highest resin temperature controlled in a range from 180° C. to 330° C., and it is more preferred to perform melt-kneading at 200° C. to 310° C. The highest resin temperature referred to here is the highest one of the temperatures measured by the resin thermometers installed at equal intervals at multiple places in the extruder. In the case where the highest resin temperature is lower than 180° C., the reactivity between the polymers is low, and in the case where it is higher than 330° C., the thermal decomposition of the polymers progresses, to lower the impact absorbability. So, it is preferred to perform melt-kneading with the highest resin temperature controlled in a range from 180° C. to 330° C.

In the case where a twin-screw extruder is used, it is preferred to introduce an inert gas from the raw material feed portion for inhibiting thermal deterioration during melt kneading. As the inert gas, nitrogen gas is preferred.

To the thermoplastic resin composition, as required, other ingredients than the aforementioned resins (A) and (B) can be added. The other ingredients include a filler, thermoplastic resin, rubber and various additives.

For example, a filler may be used as required to improve strength, dimensional stability, etc. The form of the filler can be fibrous or non-fibrous, and a fibrous filler and a non-fibrous filler can also be used in combination.

Examples of the filler include fibrous fillers such as glass fibers, milled glass fibers, carbon fibers, potassium titanate whiskers, zinc oxide whiskers, aluminum borate whiskers, aramid fibers, alumina fibers, silicon carbide fibers, ceramic fibers, asbestos fibers, gypsum fibers and metal fibers, and non-fibrous fillers such as silicates including wollastonite, zeolite, sericite, kaolin, mica, clay, pyrophyllite, bentonite, asbestos, talc and alumina silicate, metal compounds including alumina, silicon oxide, magnesium oxide, zirconium oxide, titanium oxide and iron oxide, carbonates including calcium carbonate, magnesium carbonate and dolomite, sulfates including calcium sulfate and barium sulfate, hydroxides including magnesium hydroxide, calcium hydroxide and aluminum hydroxide, glass beads, ceramic beads, boron nitride and silicon carbide. These fillerscan also be hollow, and two or more of these fillers can also be used together. Further, it is preferred that these fibrous fillers and/or non-fibrous fillers are preliminarily treated with a coupling agent such as an isocyanate-based compound, organic silane-based compound, organic titanate-based compound, organic borane-based compound or epoxy compound, since more excellent mechanical strength can be obtained.

In the case where any of these fillers is used to improve strength, dimensional stability, etc., the mixed amount of it is not especially limited, but it is preferred to mix 30 to 400 parts by weight of a filler per 100 parts by weight of the thermoplastic resin composition.

Furthermore, to the thermoplastic resin composition, as required, another rubber and various additives can also be added to such an extent that the properties of the thermoplastic resin composition are not impaired.

Examples of the rubber include diene-based rubbers such as polybutadiene, polyisoprene, styrene-butadiene random copolymer and block copolymer, hydrogenation product of the block copolymer, acrylonitrile-butadiene copolymer, and butadiene-isoprene copolymer, ethylene-propylene random copolymer and block copolymer, ethylene-butene random copolymer and block copolymer, ethylene-$\alpha$-olefin copolymers, ethylene-unsaturated carboxylic acid copolymers such as ethylene-acrylic acid copolymer and ethylene-methacrylic acid copolymer, ethylene-unsaturated carboxylic acid ester copolymers such as ethylene-acrylic acid ester copolymers and ethylene-methacrylic acid ester copolymers, ethylene-unsaturated carboxylic acid copolymers with a metal salt contained partially as the unsaturated carboxylic acid, namely, ethylene-unsaturated carboxylic acid-unsaturated carboxylic acid metal salt copolymers such as ethylene-acrylic acid-acrylic acid metal salt copolymers, and ethylene-methacrylic acid-methacrylic acid metal salt copolymers, acrylic elastic polymers such as acrylic acid ester-butadiene copolymer, for example, butyl acrylate-butadiene copolymer, ethylene-fatty acid vinyl ester copolymers such as ethylene-vinyl acetate copolymer, ethylene-propylene-non-conjugated ternary polymers such as ethylene-propylene-ethylidene norbornene copolymer and ethylene-propylene-hexadiene copolymer, chlorinated polyethylene, thermoplastic elastomers such as polyamide elastomers, and polyester elastomers, their modification products, etc. Two or more of these rubbers can also be used together. In the case where a rubber is used, the mixed amount of it is not especially limited, but it is preferred that 1 to 400 parts by weight of a rubber are mixed per 100 parts by weight of the thermoplastic resin composition.

The various additives that can be added to the thermoplastic resin composition include preferably a crystal nucleating agent, coloration preventive, antioxidant such as hindered phenol or hindered amine, releasing agent such as ethylene bisstearylamide or higher fatty acid ester, plasticizer, thermal stabilizer, lubricant, ultraviolet preventive, colorant, flame retarder, foaming agent, etc.

These rubber and various additives can be mixed at any arbitrary stage while the thermoplastic resin composition is produced. For example, in the case where a twin-screw extruder is used for producing the thermoplastic resin composition, usable are a method of adding them simultaneously when the resins are mixed, a method of feeding them from a side while the resins are melt-kneaded, a method of adding them after the resins have been melt-kneaded, and a method of adding them to either of the resins constituting the thermoplastic resin, melt-kneading the mixture, and mixing the other resin.

In the case where a twin-screw extruder is used to produce the thermoplastic resin composition, in view of higher reactivity, a supercritical fluid can also be introduced during melt kneading in the twin-screw extruder. The supercritical fluid refers to a fluid having both the nature of a gas (diffusibility) and the nature of a liquid (dissolvability) in a state of exceeding the limit point (critical point) at which the fluid can exist as both a gas and a liquid. Examples of the supercritical fluid include supercritical carbon dioxide, supercritical nitrogen, supercritical water, etc. Preferably supercritical carbon dioxide and supercritical nitrogen can be used, and most preferably supercritical carbon dioxide can be used.

As the method for molding the thermoplastic resin composition, an arbitrary method can be used, and an arbitrary shape can be obtained by molding. As the molding method, for example, extrusion molding, injection molding, blow molding, calender molding, compression molding, vacuum forming, expansion molding, etc. can be used. The thermoplastic resin composition can be molded into such shapes as pellets, plates, fibers, strands, films or sheets, pipes, hollow articles and boxes.

The molded articles obtained as described above are excellent in heat resistance and impact resistance, and especially in the case where thin articles and slender articles such as films and fibers are produced by molding, the molded articles have an effect of being able to remarkably exhibit a peculiar viscoelastic property.

In general if a molded article such as fibers or a film formed of a thermoplastic resin is tested to evaluate tensile properties at various stress rates, the molded article shows such a behavior that the tensile elastic modulus becomes higher while the tensile elongation declines at a higher stress rate. On the contrary, a molded article such as fibers or a film formed of the thermoplastic resin composition shows such a peculiar viscoelastic property that the tensile elastic modulus declines at a higher stress rate, and further shows quite a contrary property that the tensile elongation increases. So, the molded article is useful as fibers or a film with such a peculiar viscoelastic property. Especially the peculiar viscoelastic property can be observed in thin articles, slender articles, stretched fibers and stretched films and is very useful.

In the case where fibers are produced from the thermoplastic resin composition, publicly known spinning and stretching techniques can be used. As the stretching and spinning techniques, for example, a method in which a melt-spun yarn or a strand discharged from an extruder is once wound and stretched, a method in which a melt-spun yarn or a strand discharged from an extruder is continuously stretched without being once wound can be used.

In the case where a film is produced from the thermoplastic resin composition, publicly known film molding techniques can be used. For example, usable are a method of extruding a flat film from a T die installed in an extruder, a method of monoaxially or biaxially stretching the film for obtaining an oriented film, an inflation method of inflating from a circular die installed in an extruder for obtaining a cylindrical film.

Further, in the case where a twin-screw extruder is used to produce the thermoplastic resin composition, the abovementioned spinning and stretching, process or film forming process can be established in direct connection with the twin-screw extruder.

Furthermore, the molded article formed of the thermoplastic resin composition has a feature that the peak value of loss tangent (tan δ) becomes large and exhibits excellent vibration energy absorbing performance. For this reason, the molded article is especially useful for applications where sound absorbability, heat absorbability, vibration damping property and seismic isolation property are required.

Moreover, the thermoplastic resin composition has a deflection temperature under load of 45° C. or higher at 0.45 MPa and, when a cone with a mass of 193 kg is allowed to freely fall from a drop height of 0.5 m onto a cylinder with an outermost diameter of 50 mm, a wall thickness of 2 mm and a height of 150 mm obtained by molding the resin composition, the maximum point load acting on the cone is less than 20 kilonewtons, while cracks of 5 cm or more do not occur in the cylinder.

The deflection temperature at a load of 0.45 MPa is measured using JIS No. 1 strip specimens obtained by injection molding and conditioned at conditions of 23° C. and 50% RH for 48 hours, according to ISO75-1,2, for example, using HDT Tester S3-MH produced by Toyo Seiki Seisaku-Sho, Ltd.

Figure 4:
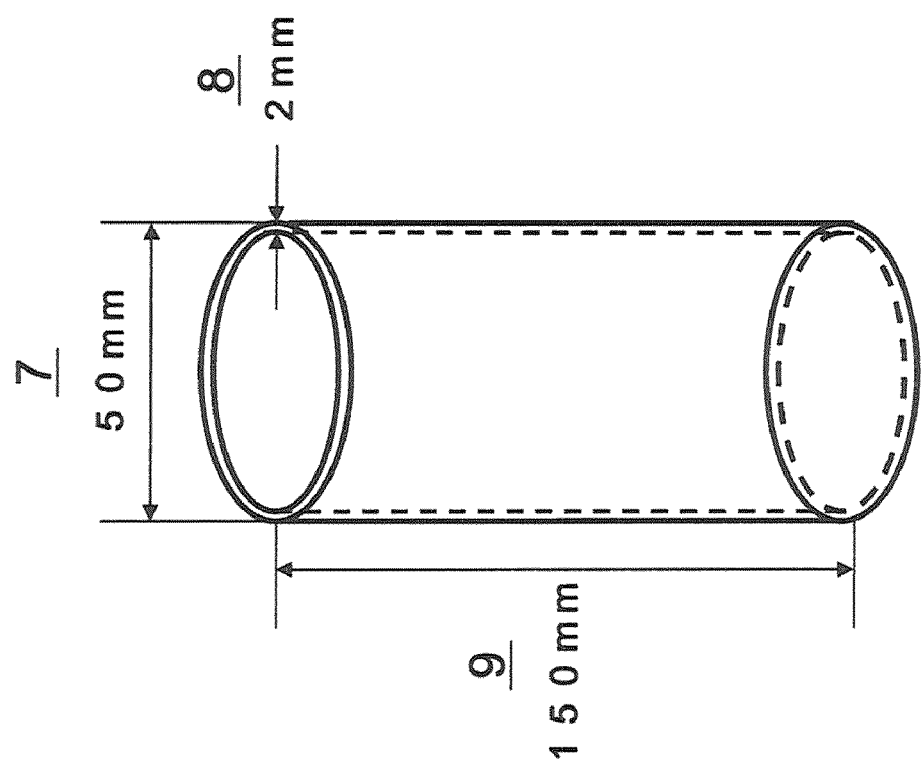
FIG. 4 is an illustration showing the shape of a molded cylinder used for a large-load high-speed free fall drop impact test.

The molded cylinder with an outermost diameter of 50 mm, a wall thickness of 2 mm and a height of 150 mm is prepared according to the following procedure. At first, a dried thermoplastic resin composition is supplied into a single-screw extruder, and a round bar with a diameter of 50 mm is prepared by extrusion molding. Then, the round bar is cut to a length of 150 mm, and finally the round bar of the thermoplastic resin compound is hollowed out using a lathe, to achieve a wall thickness of 2 mm. The outermost diameter referred to here is indicated as 7 in FIG. 4, the wall thickness, as 8 in FIG. 4, and the height, as 9 in FIG. 4.

The abovementioned cylinder is erected on a horizontal base with one of the circles at the bottom, and a cone (weight) with a mass of 193 kg is allowed to freely fall from a drop height of 0.5 m so that the cone could contact the circle of the cylinder in parallel. In this case, the speed immediately before the cone contacts the cylinder is as high as 11.3 km/h. The thermoplastic resin composition has such a remarkable non-viscoelastic property that it becomes softer at the time of higher-speed deformation. Therefore, when the test is conducted, the maximum point load acting on the cone is less than 20 kilonewtons, which load is low compared with the load allowed by the conventional materials, and the molded cylinder per se is not greatly fractured without having cracks of 5 cm or more to occur, and is excellent for application as an impact absorbing member.

The molded articles of the thermoplastic resin composition are suitable for such applications as electronic parts typified by connectors, coils, sensors, LED lamps, sockets, resistors, relay cases, small switches, coil bobbins, capacitors, variable capacitor cases, optical pick-ups, vibrators, various terminal boards, transformers, plugs, printed boards, tuners, speakers, microphones, head phones, small motors, magnetic head bases, power modules, semiconductors, liquid crystal-related parts, FDD carriages, FDD chassis, motor brush holders, parabolic antennas and computer-related parts, and also for electric apparatus parts such as generators, motors, transformers, current transformers, voltage regulators, rectifiers, inverters, relays, power contacts, switches, circuit breakers, knife switches, multi-pole rods and electric part cabinets, household and office electric appliance parts typified by VTR parts, TV parts, irons, hair dryers, rice cooker parts, electric oven parts, audio-visual apparatus parts including acoustic parts, Audio Laser Discs (registered trademark), compact discs and DVDs, illumination parts, refrigerator parts, air conditioner parts, typewriter parts and word processor parts; machine-related pans typified by office computer-related parts, telephone set-related parts, facsimile-related parts, copier-related parts, washing tools, motor parts, lighters and typewriters; optical apparatus- and precision machine-related parts typified by microscopes, binoculars, cameras and time pieces; automobile- and vehicle-related parts such as alternator terminals, alternator connectors, IC regulators, light deer potentiometer bases, various valves including exhaust gas valves, various pipes, hoses and tubes for fuel system, cooling system, brake system, wiper system, exhaust gas system and suction system, air intake nozzle snorkels, intake manifolds, fuel pumps, engine cooling water joints, carburetor main bodies, carburetor spacers, exhaust gas sensors, cooling water sensors, oil temperature sensors, brake pad wear sensors, throttle position sensors, crankshaft position sensors, air flow meters, brake pad wear sensors, peripheral parts of batteries, thermostat bases for air conditioners, heating air flow control valves, brush holders for radiator motors, water pump impellers, turbine vanes, wiper motor-related parts, distributors, starter switches, starter relays, transmission wire harnesses, window washer nozzles, air conditioner panel switch boards, coils for fuel-related electromagnetic valves, connectors such as wire harness connectors, SMJ connectors, PCB connectors, door grommet connectors and fuse connectors, electric equipment parts insulating plates, step motor rotors, lamp sockets, lamp reflectors, lamp housings, brake pistons, solenoid bobbins, engine oil filters igniter cases, torque control levers, safety belt parts, register blades, washer levers, window regulator handles, window regulator handle knobs, passing light levers, sun visor brackets, instrument panels, peripheral parts of air bags, door pads, pillars, console boxes, various motor housings, roof rails, fenders, garnishes, bumpers, door panels, roof panels, hood panels, trunk lids, door mirror stays, spoilers, hood louvers, wheel covers, wheel caps, grill apron cover frames, lamp bezels, door handles, door braids, rear finishers and wipers, etc.

The thermoplastic resin composition is suitable for application as films and sheets, and can be suitably used as films and sheets for packaging, films and sheets for automobile members, films and sheets for industrial use, films and sheets for agriculture and civil engineering, films and sheets for medical service, films and sheets for electric and electronic apparatus members, films and sheets for miscellaneous living goods, etc.

The thermoplastic resin composition is suitable also as fibers such as long fibers, short fibers, monofilaments and crimped yarns and can be suitably used for application as impact absorbing members, for example, garments such as uniforms, working wear, sports wear and T shirts, general and industrial materials such as nets, ropes, spanbond, abrasive brushes, industrial brushes, filters and papermaking wire cloths, bedding and interior articles such as blankets, futon pad wrapping cloths and curtains, miscellaneous living goods such as toothbrushes, body brushes, spectacle frames, umbrellas, covers, shopping bags and wrapping cloths, etc.

The thermoplastic resin composition can be suitably used as impact absorbing members such as internal and external parts of automobiles and outside sheets of automobiles.

The thermoplastic resin composition is suitable also as architectural materials, walls and roofs of civil engineering buildings, ceiling-related parts, window-related parts, insulating material-related parts, floor-related parts, seismic isolation- and vibration damping-related parts, and lifeline-related parts.

The thermoplastic resin composition is suitable also as sporting goods and can be suitably used as impact absorbing members, for example, golf-related articles such as golf clubs and shafts, grips and golf balls, sports racket-related articles such as tennis rackets, badminton rackets and their guts, masks for American football games, baseball games and softball games, body protectors for sports such as helmets, breast pads, elbow pads and knee pads, wear-related articles such as sportswear, shoes-related articles such as soles of shoes, fishing-related articles such as fishing rods and fishing lines, summer sports-related articles such as surfboards, winter sports-related articles such as ski and snow boards, other indoor and outdoor sports-related articles, etc.

EXAMPLES

The effects are explained below more particularly in reference to examples. Meanwhile, this disclosure is not limited to or by the following examples.

In Examples 1 to 6 and Comparative Examples 1 to 10, the following raw materials were used:
- (A) Polyamide 6 resin (hereinafter abbreviated as PA6 resin), "CM1017" (produced by Toray Industries, Inc.)
- (B) Glycidyl methacrylate-modified polyethylene copolymer (hereafter abbreviated as GMA-modified PE copolymer), "Bondfast BF-7L" (produced by Sumitomo Chemical Co., Ltd.)
- (C) Unmodified polyethylene copolymer (hereinafter abbreviated as unmodified PE copolymer), "LOTRYL29MA03" (produced by Arkema)

In Examples 7 to 18 and Comparative Examples 11 to 23, the following raw materials were used:
- (A-1) Polyamide 6 resin with a melting point of 225° C., a relative viscosity of 2.75 measured in a 0.01 g/ml solution of 98% sulfuric acid and a water content of 500 ppm
- (A-2) Polyamide 6 resin with a melting point of 225° C., a relative viscosity of 2.75 measured in a 0.01 g/ml solution of 98% sulfuric acid and a water content of 7,000 ppm
- (A-3) Polyamide 66 resin with a melting point of 265° C., a relative viscosity of 2.75 measured in a 0.01 g/ml solution of 98% sulfuric acid and a water content of 500 ppm
- (A-4) Polyamide 610 resin with a melting point of 225° C., a relative viscosity of 2.70 measured in a 0.01 g/ml solution of 98% sulfuric acid and a water content of 500 ppm
- (A-5) Polyamide 11 resin with a melting point of 190° C., a relative viscosity of 2.55 measured in a 0.01 g/ml solution of 98% sulfuric acid and a water content of 500 ppm
- (A-6) Polybutylene terephthalate resin with a melting point of 225° C., an intrinsic viscosity of 0.70 measured in a 0.5% solution of o-chlorophenol, a carboxyl end group amount of 35 eq/t and a water content of 100 ppm
- (B-1) Glycidyl methacrylate-modified polyethylene copolymer with a water content of 200 ppm (hereinafter abbreviated as GMA-modified PE copolymer) "Bondfast BF-7L" (produced by Sumitomo Chemical Co., Ltd.)
- (B-2) Maleic anhydride-modified ethylene-1-butene copolymer with a water content of 200 ppm "Toughmer MH7020" (produced by Mitsui Chemicals, Ltd.)
- (B-3) Ethylene-methacrylic acid-zinc methacrylate copolymer with a water content of 200 ppm "Himilan 1706" (produced by Du Point-Mitsui Polychemicals Co., Ltd.)
- (C-1) Unmodified polyethylene copolymer with a water content of 200 ppm (hereinafter abbreviated as unmodified. PE copolymer) "LOTRYL29MA03" (produced by Arkema)
- (D-) Thermoplastic polyurethane "Elastollan NY97A" (produced by BASF)

(1) Injection Molding for Preparing Specimens

An injection molding machine produced by Nissei Plastic Industrial Co., Ltd. (NP7-1F) was used to prepare JIS-5A dumbbell specimens (75 mm long, 12.5 mm wide at ends and 2 mm thick) and JIS No. 1 strip specimens (10 mm wide, 80 mm long and 4 mm thick) under conditions of 260° C. molding temperature, 80° C. mold temperature and lower limit pressure+5 kgf/cm$^2$ as injection pressure.

(2) Observation of Morphology with Three-Dimensional Electron Microscope

A JIS-5A dumbbell specimen obtained by injection molding was cut to a 1 to 2 mm square, and the square piece was dyed with ruthenium tetraoxide. Subsequently a very thin section with a thickness of 80 nm was obtained by cutting with an ultramicrotome produced by Leica at a temperature of −196° C. (liquid nitrogen temperature). On the surface of the very thin section, several drops of ethanol containing dispersed gold particles with a diameter of about 10 nm were dropped to uniformly disperse the gold particles on the surface of the sample. Then, the sample was set in a three-dimensional electron microscope, JEM-2200FS (produced by JEOL), and at an observation magnification of 50,000× and an acceleration partial pressure of 200 kV, the sample was inclined in steps of 1° in an inclination angle range from −60° to +60° C., for imaging to obtain 121 transmission images. From these transmission images obtained by inclining the sample, three-dimensional data was reconstituted, to obtain a three-dimensional transmission image. The three-dimensional transmission image was rotated to confirm whether or not three-dimensionally connective structures Cs containing a continuous phase component were formed in the respective dispersed phase particles of the dispersed phase. Further, from the transmission image at an inclination angle of 0°, the rate of the area of the connective structures Cs occupying the section of each dispersed phase particle Dp with an average particle size of 1,000 nm or less was calculated using image analysis software "Scion Image" produced by Scion Corporation.

(3) Evaluation of Tensile Elastic Modulus and Tensile Fracture Elongation

A JIS-5A dumbbell specimen obtained by injection molding was set in Autograph AG100kNG (produced by Shimadzu Corporation), and tensile-tested at an inter-chuck distance of 50 mm at a speed of 100 mm/min, 500 mm/min or 1,000 mm/min, to evaluate the tensile elastic modulus and the tensile fracture elongation at each speed. Meanwhile, the tensile fracture elongation is a fracture elongation value in terms of an inter-chuck distance of 500 mm.

(4) Evaluation of Yield Strength, Tensile Fracture Elongation and Impact Absorbing Energy by High-Speed Tensile Test A JIS-5A dumbbell specimen obtained by injection molding was set in Servopulser EHF-U2H-20L high-speed face impact testing machine produced by Shimadzu Corporation, and tensile-tested at an inter-chuck distance of 50 mm at a high speed of 3.6 km/h (60,000 mm/min) at 20° C. or −20° C., to evaluate the yield strength, tensile fracture elongation and impact absorbing energy. Meanwhile, the tensile fracture elongation is a fracture elongation value in terms of an inter-chuck distance of 50 mm.

(5) Evaluation of Impact Strength

A JIS No. 1 strip specimen obtained by injection molding was set in Charpy Impact Testing Machine produced by Toyo Seiki Seisaku-Sho, Ltd., and a Charpy impact test was performed at 23° C. and 50% RH according to ISO179.

(6) Evaluation of Deflection Temperature Under Load

A JIS No. 1 strip specimen obtained by injection molding was set in HDT Tester S3-MH produced by Toyo Seiki Seisaku-Sho, Ltd., and the specimen was conditioned under conditions of 23° C. and 50% RH for 48 hours. The deflection temperature of the specimen under load (load 0.45 MPa) was measured according to ISO75-1,2.

(7) Evaluation of Loss Tangent (Tan δ)

A JIS-5A dumbbell specimen obtained by injection molding was cut to obtain a 30 mm long, 3.5 mm wide and 2 mm thick strip specimen. The strip specimen was set in a dynamic viscoelasticity automatic measuring instrument produced by A&D Co., Ltd. (Rheovibron DDV-25FP), and the loss tangent (tan δ) was measured under conditions of 5° C./min heating rate, 0.4% strain amplitude, 1 Hz frequency and −150 to 150° C. test temperatures.

(8) Measurement of Relaxation Time of Carbon Nucleus by Solid NMR

A solid NMR sample tube was filled at its center with the pellets of the thermoplastic resin composition, and was set in a solid NMR measuring instrument (CMX-300 Infinity produced by Chemagnetics), to measure the relaxation time T1C of each carbon nucleus by Torchia method at room temperature using 13 C as the observation nucleus at an observation frequency of 75.2 MHz and a pulse width of 4.5 μs. The peak corresponding to the carbon of each carbonyl group of the polyamide resin (A1) was set at 174 ppm, and the peak corresponding to the carbon of the hydrocarbon group adjacent to each NH group was set at 42 ppm. After measurement, two-component analysis was performed. Among the two relaxation times in the two-component analysis of the relaxation time corresponding to the carbon of each carbonyl group, the longer relaxation time was identified as T1C1, and among the two relaxation times in the two-component analysis of the relaxation time corresponding to the carbon of the hydrocarbon group adjacent to each NH group, the longer relaxation time was identified as T1C2.

(9) Observation of Morphology

A JIS-5A dumbbell specimen obtained by injection molding was dyed with ruthenium tetraoxide, and a very thin section was obtained by cutting the specimen. The morphology was observed using a transmission electron microscope (H-7100 Transmission Electron Microscope produced by Hitachi, Ltd.) at a magnification of 35,000×, and the continuous phase component was identified. Further, at a magnification of 50,000×, whether or not fine particles existed in, the dispersed phase was observed, and the rate of the area of the fine particles occupying each dispersed phase particle of the dispersed phase was calculated using image analysis software "Scion Image" produced by Scion Corporation.

(10) Measurement of Water Content of Raw Material

Moisturemeter CA-100 produced by Mitsubishi Chemical Corporation) was used to measure according to ISO5512. The particular method is described below. An about ten grams of a sample was weighed and placed in a transparent Erlenmeyer flask with a ground stopper, and 20 ml of methanol was added using a dispenser. A reflux condenser with a silica gel tube was attached to the flask, and the mixture was boiled at 150° C. for 3 hours. Then, it was allowed to stand at room temperature for 45 minutes, to be cooled, and 0.5 ml of the methanol extract was taken using a syringe and injected into a digital slight water content measuring instrument (CA-100 Moisturemeter produced by Mitsubishi Chemical Corporation). The indicated value was read (a). As a reference, a similar experiment was performed using methanol only, and the indicated value was read (b). The water content was calculated from the following formula:

Water content(ppm)=$(a-b) \div (W \times V1/V2) \times 10^6$ a: Water content in 0.5 ml of extracted methanol (g)
b: Water content in 0.5 ml of extracted reference methanol (g)
W: Weight of sample (about 1.0 g)
V1: Amount taken by syringe (0.5 ml)
V2: Amount of methanol used for extraction (20 ml)

(11) Preparation of Molded Cylinder

A cylinder with an outermost diameter of 50 mm, a wall thickness of 2 mm and a height of 150 mm was prepared by molding according to the following procedure. At first, a thermoplastic resin composition dried in vacuum at 80° C. for more than 12 hours was supplied into a single-screw extruder with a screw diameter of 35 mm and L/D0=25 (produced by Rikua), and a round bar with a diameter of 50 mm was prepared by extrusion molding under conditions of 260° C. extrusion temperature, 12 rpm screw rotation speed and 0.4 m/h take-up speed. Subsequently the round bar was cut to a length of 150 mm, and finally the round bar of the thermoplastic resin composition was hollowed out using a lathe, to achieve a wall thickness of 2 mm. In this case, the outermost diameter is indicated as 7 in FIG. 4, the wall thickness, as 8 in FIG. 4, and the height, as 9 in FIG. 4.

(12) Evaluation of Maximum Point Load and Whether Fracture Occurred or not, by Large-Load High-Speed Free Fall Drop Impact Test GSE Drop Impact Tester produced by Japan Automobile Research Institute was used to perform a drop impact test according to the following procedure. The abovementioned cylinder was erected on a horizontal base with one of the circles at the bottom, and a cone (weight) with a mass of 193 kg was allowed to freely fall from a drop height of 0.5 m so that the cone could contact the circle of the cylinder in parallel. In this case, the speed immediately before the cone contacted the cylinder was 11.3 km/h. In the test, a laser displacement gauge (LBP300 produced by Keyence, specially ordered), load cell (CLP-30BS produced by Tokyo Sokki Kenkyujo Co., Ltd.), dynamic strain gauge (DPM-13A produced by Kyowa Electronics Instruments Co., Ltd.), data recorder (SIR1000W produced by Sony Corporation), and A/D conversion data recorder (M03-6358 produced by Kyowa Electronics Instruments Co., Ltd.) were used to analyze the relationship between the load and the displacement acting on the cone and to obtain the maximum point load acting on the cone. Further, after completion of test, the molded cylinder was observed to visually check whether or not cracks of 5 cm or more occurred.

Examples 1 and 2

Figure 2:
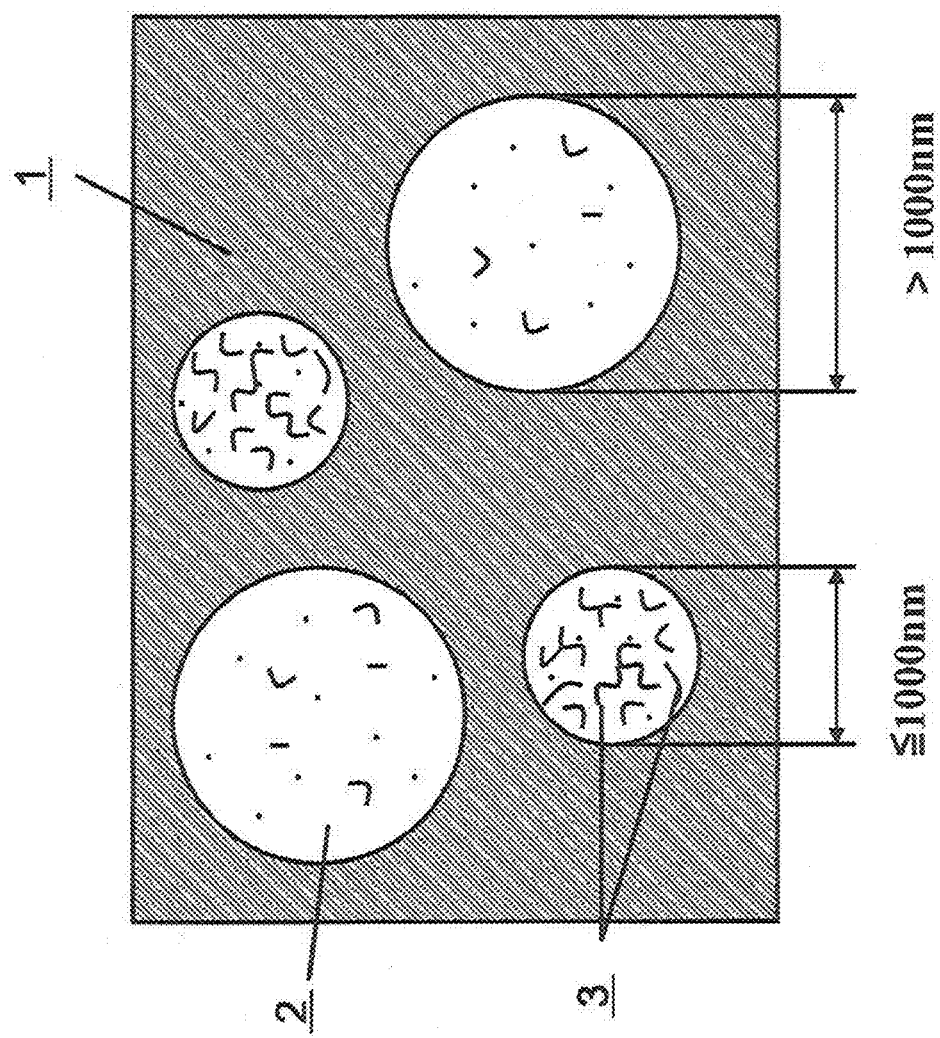
FIG. 2 is a typical view (general view) of a three-dimensional transmission image at an inclination angle of 0°.
Figure 3:
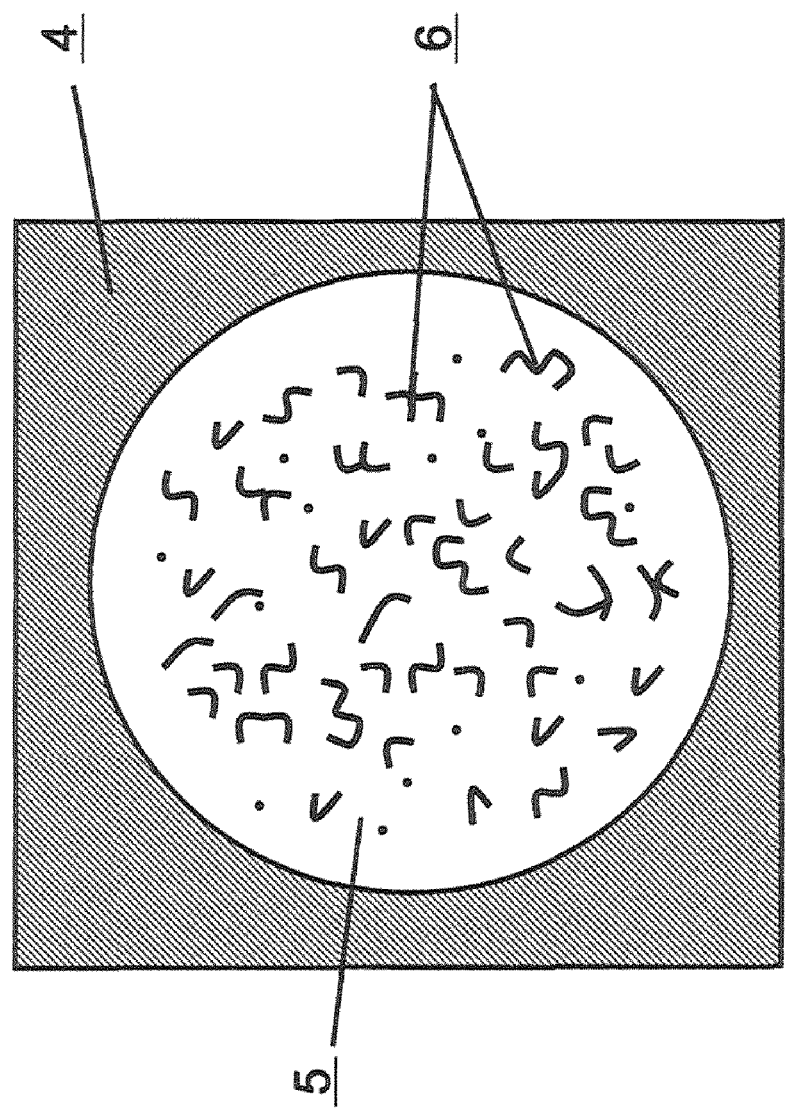
FIG. 3 is a typical view (expanded dispersed phase view) of a three-dimensional transmission image at an inclination angle of 0°.

The PA6 resin was used as the thermoplastic resin (A), and the GMA modified PE copolymer was used as the reactive functional group-containing resin (B). They were mixed at each mixing ratio shown in Table 1, and while the removal of the volatile component and nitrogen flow by a vacuum pump were effected, a completely intermeshing twin-screw extruder having two double-start thread screws rotating in the same direction, with a screw diameter of 37 mm and L/D0=100 (TEM-37BS-26/2V produced by Toshiba Machine Co., Ltd.) was used to perform melt-kneading at a cylinder temperature of 260° C. and at the screw rotation speed and the extrusion rate shown in Table 1, and a molten resin was discharged as a strand from the discharge port (L/D=100). In this case, a colorant was supplied together with the raw materials, and the time when the coloration of the extruded product became maximum was measured for obtaining the dwell time shown in Table 1. Further, the following screw constitution (called the screw constitution A) was employed. Kneading zones were established at 7 places starting from the positions of L/D0=22, 28, 43, 55, 69, 77 and 93, and the lengths Lk/D0 of the respective kneading zones were Lk/D0=1.8, 1.8, 2.3, 2.3, 2.3, 2.3 and 3.0 in the corresponding order. On the downstream side in each kneading zone, a reverse screw region was established, and the lengths Lr/D0 of the respective reverse screw regions were Lr/D0=0.4, 0.4, 0.8, 0.8, 0.4, 0.8 and 0.4 in the corresponding order. Furthermore, the rate of the total length of the kneading zones to the entire screw length was calculated from (Total length of kneading zones)÷(Entire length of screw)×100. The rate of the total length of kneading zones was 16%. Moreover, the value obtained by subtracting the resin pressure Pfmin (MPa) of the full flight zone with the minimum resin pressure among the resin pressures indicated by the resin pressure gauges installed in the multiple full flight zones from the resin pressure Pkmax (MPa) of the kneading zone with the maximum resin pressure among the resin pressures indicated by the resin pressure gauges installed in the multiple kneading zones, is shown in Table 1. Further, the molten resin discharged as a strand was passed through a cooling bath, to be cooled, and taken up and cut by a pelletizer, to obtain pellets of the thermoplastic resin composition as a sample. The sample was dried and specimens for evaluation were prepared by injection molding, to evaluate various properties. The results are shown in Table 2. Furthermore, the three-dimensional transmission image (50,000×, 250 nm×250 nm×75 nm) at an inclination angle of 0° in Example 1 is shown in FIG. 1. In the measurement, the sample was inclined in steps of 1° in an inclination angle range from −60° to +60°, and for imaging to obtain 121 transmission images. From these transmission images, three-dimensional data was reconstituted to obtain a three-dimensional transmission image. The three-dimensional transmission image was rotated to confirm whether or not three-dimensionally connective structures Cs containing a continuous phase component were formed in the respective dispersed phase particles of the dispersed phase, and the result is shown in Table 2. Furthermore, a typical view (general view) of the three-dimensional transmission image at an inclination angle of 0° C. is shown in FIG. 2, and a typical view (expanded dispersed phase particle view) of the three-dimensional transmission image at an inclination angle of 0° is shown in FIG. 3. From the transmission image at an inclination angle of 0°, the rate of the area of the connective structures Cs occupying the section of each dispersed phase particle Dp with an average particle size of 1,000 nm or less (3 of FIG. 2) was calculated using image analysis software "Scion Image" produced by Scion Corporation, and the result is shown in Table 2.

Comparative Examples 1 and 2

Melt kneading was performed to obtain thermoplastic resin compositions as described for Examples 1 and 2, except that the following screw constitution (called the screw constitution B) (kneading zones were established at seven places starting from the positions of L/D0=22, 28, 43, 55, 69, 77 and 93, and the lengths Lk/D0 of the respective kneading zones were Lk/D0=1.8, 1.8, 2.3, 2.3, 2.3, 2.3 and 3.0 in the corresponding order) was employed, and that no reverse screw regions were established. The kneading conditions are shown in Table 1, and the evaluation results of the obtained thermoplastic resin compositions are shown in Tables 2 and 3.

Comparative Example 3

Melt kneading was performed to obtain a thermoplastic resin composition as described for Examples 1 and 2, except that an unmodified polyethylene copolymer was used. The kneading conditions are shown in Table 1, and the evaluation results of the obtained thermoplastic resin composition are shown in Tables 2 and 3.

Example 3

Melt kneading was performed as described for Example 1, to obtain a thermoplastic resin composition, except that the thermoplastic resin composition was discharged from a sampling valve of L/D0=72 installed in the completely intermeshing twin-screw extruder having two double-start thread screws rotating in the same direction with a screw diameter of 37 mm and L/D0=100 (TEM-37BS-26/2V produced by Toshiba Machine Co., Ltd.). The kneading conditions are shown in Table 1, and the evaluation results of the obtained thermoplastic resin composition are shown in Tables 2 and 3. Meanwhile, the rate (%) of the total length of the kneading zones to the entire screw length was calculated from (Total length of kneading zones)÷(Entire screw length)×100, and was found to be 15%.

Comparative Example 4

Melt kneading was performed as described for Example 3, to obtain a thermoplastic resin composition, except that the screw constitution B was employed. The kneading conditions are shown in Table 1, and the evaluation results of the obtained thermoplastic resin composition are shown in Tables 2 and 3.

Comparative Example 5

Melt kneading was performed as described for Comparative Example 4, to obtain a thermoplastic resin composition, except that the thermoplastic resin composition was discharged from a sampling valve of L/D0=40 installed in the completely intermeshing twin-screw extruder having two double-start thread screws rotating in the same direction with a screw diameter of 37 mm and L/D0=100 (TEM-37BS-26/2V produced by Toshiba Machine Co., Ltd.). The kneading conditions are shown in Table 1, and the evaluation results of the obtained thermoplastic resin composition are shown in Tables 2 and 3. Meanwhile, the rate (%) of the total length of the kneading zones to the entire screw length was calculated from (Total length of kneading zones)÷(Entire screw length)×100, and was found to be 9%.

TABLE 1

| | Thermo-plastic resin (A) [parts by weight] | Reactive functional group-containing resin (B) [parts by weight] | Unmodified PE copolymer [parts by weight] | L/D of twin-screw extruder [—] | Screw constitution [—] | Screw rotation speed [rpm] | Extrusion rate [kg/h] | Extrusion rate per 1 rpm [kg/h] | Dwell time [min] | Pkmax-Pfmin [MPa] |
|---|---|---|---|---|---|---|---|---|---|---|
| Example 1 | 70 | 30 | | 100 | A | 100 | 10 | 0.1 | 8 | 1.1 |
| Example 2 | 80 | 20 | | 100 | A | 100 | 10 | 0.1 | 8 | 0.7 |
| Example 3 | 70 | 30 | | 72 | A | 100 | 10 | 0.1 | 5 | 1.1 |
| Comparative Example 1 | 70 | 30 | | 100 | B | 100 | 10 | 0.1 | 5 | 0.2 |
| Comparative Example 2 | 80 | 20 | | 100 | B | 100 | 10 | 0.1 | 5 | 0.1 |
| Comparative Example 3 | 70 | 30 | 30 | 100 | A | 100 | 10 | 0.1 | 8 | 0.8 |
| Comparative Example 4 | 70 | 30 | | 72 | B | 100 | 10 | 0.1 | 3.5 | 0.2 |
| Comparative Example 5 | 70 | | 40 | | B | 100 | 20 | 0.2 | 0.5 | 0.2 |

TABLE 2

| | Resin of continuous phase [—] | Whether or not connective formations Cs are formed [—] | Rate of the area of connective formations Cs [%] | Tensile elastic modulus [GPa] | | | Tensile fracture elongation [%] | | |
|---|---|---|---|---|---|---|---|---|---|
| | | | | 100 mm/min | 500 mm/min | 1000 mm/min | 100 mm/min | 500 mm/min | 1000 mm/min |
| Example 1 | (A) | ○ | 34 | 1.4 | 1 | 0.8 | 141 | 167 | 175 |
| Example 2 | (A) | ○ | 25 | 1.7 | 1.2 | 1 | 157 | 176 | 184 |
| Example 3 | (A) | ○ | 22 | 1.5 | 1.2 | 1 | 138 | 151 | 162 |
| Comparative Example 1 | (A) | ○ | 7 | 1.5 | 1.4 | 1.2 | 135 | 142 | 150 |
| Comparative Example 2 | (A) | ○ | 4 | 1.9 | 1.7 | 1.6 | 142 | 153 | 162 |
| Comparative Example 3 | (A) | x | — | 1.4 | 1.6 | 1.7 | 30 | 28 | 25 |
| Comparative Example 4 | (A) | ○ | 5 | 1.6 | 1.5 | 1.4 | 131 | 139 | 145 |
| Comparative Example 5 | (A) | x | — | 1.6 | 1.7 | 1.8 | 128 | 121 | 115 |

TABLE 3

| | High-speed tensile test (3.6 km/h, 20° C.) | | | High-speed tensile test (3.6 km/h, 20° C.) | | | | Deflection temperature under load [° C.] | tan δ [—] |
|---|---|---|---|---|---|---|---|---|---|
| | Yield strength [MPa] | Fracture elongation [%] | Impact absorbing energy [J] | Yield strength [MPa] | Fracture elongation [%] | Impact absorbing energy [J] | Impact strength [kJ/m2] | | |
| Example 1 | 61 | 63 | 6 | 80 | 53 | 6.5 | 82 | 74 | 0.174 |
| Example 2 | 78 | 35 | 4.5 | 96 | 31 | 4.9 | 29 | 121 | 0.166 |
| Example 3 | 64 | 38 | 4.1 | 84 | 35 | 4.8 | 74 | 65 | 0.152 |
| Comparative Example 1 | 64 | 32 | 3.3 | 85 | 25 | 3.5 | 75 | 65 | 0.157 |
| Comparative Example 2 | 83 | 22 | 2.7 | 103 | 18 | 3.3 | 25 | 115 | 0.145 |
| Comparative Example 3 | 75 | 15 | 1.9 | 101 | 10 | 1.7 | 67 | 58 | 0.138 |
| Comparative Example 4 | 66 | 28 | 3.1 | 88 | 23 | 3.3 | 70 | 59 | 0.141 |
| Comparative Example 5 | 69 | 22 | 2.5 | 91 | 20 | 2.9 | 63 | 57 | 0.123 |

With regard to Examples 1 to 3, in each of the thermoplastic resin compositions, three-dimensionally connective structures Cs containing a continuous phase component were formed in the respective dispersed phase particles of a dispersed phase, and further, since the rate of the area of the connective structures Cs occupying the section of each dispersed phase particle Dp with an average particle size of 1,000 nm or less was large, the tensile elastic modulus remarkably declined while the tensile fracture elongation also increased greatly with the increase of the stress rate in the tensile tests. Furthermore, in the high-speed tensile tests, the impact absorbing energy values at 20° C. and −20° C. were large, and the balance between impact resistance and heat resistance was excellent, tan δ being large. Therefore, the vibration energy absorbing performance was also excellent. On the other hand, with regard to Comparative Examples 1, 2 and 4, in each of the conventional thermoplastic resin compositions, three-dimensionally connective structures Cs containing a continuous phase component were formed in the respective dispersed phase particles of a dispersed phase, but since the rate of the area of the connective structures Cs occupying the section of each dispersed phase particle Dp with an average particle size of 1,000 nm or less was small, the tensile elastic modulus declined while the tensile fracture elongation increased, though not so greatly, with the increase of the stress rate in the tensile tests. Further, compared with the properties of the thermoplastic resin compositions of Examples 1 to 3 in conformity with this disclosure, the impact absorbing energy in the high-speed tensile test was small, and the balance between impact resistance and heat resistance was poor, tan δ being small. Therefore, the vibration energy absorbing performance was also poor.

Furthermore, with regard to Comparative Examples 3 and 5, in the case where three-dimensionally connective structures Cs containing a continuous phase component were not formed in the respective dispersed phase particles of a dispersed phase, the tensile elastic modulus increased while the tensile fracture elongation also declined with the increase of the stress rate in the tensile tests. Moreover, compared with the properties of the thermoplastic resin composition of Example 1 in conformity with this disclosure, the impact absorbing energy in the high-speed tensile test greatly declined, and the balance between impact resistance and heat resistance became greatly poor, tan δ being small. Therefore, the vibration energy absorbing performance was also poor.

As can be seen from these results, if three-dimensionally connective structures containing a continuous phase component are formed in the respective dispersed phase particles of a dispersed phase while the rate of the area of the connective structures occupying the section of each dispersed phase particle of the dispersed phase is controlled in a thermoplastic resin composition containing a reactive functional group-containing resin, the balance between contradictory properties such as impact resistance and heat resistance becomes excellent, and a peculiar viscoelastic behavior not observed with the conventional polymeric materials can be remarkably exhibited. Further, the impact energy absorbing performance and the vibration energy absorbing performance at the time of high-speed deformation become remarkably excellent.

Examples 4 and 5

The PA6 resin was used as the thermoplastic resin (A1) and the GMA modified PE copolymer was used as the reactive functional group-containing resin (B). They were mixed at each mixing ratio shown in Table 4, and while the removal of the volatile component and nitrogen flow by a vacuum pump were effected, a completely intermeshing twin-screw extruder having two double-start thread screws rotating in the same direction, with a screw diameter of 37 mm and L/D0=100 (TEM-37BS-26/2V produced by Toshiba Machine Co., Ltd.) was used to perform melt-kneading at a cylinder temperature of 260° C. and at the screw rotation speed and the extrusion rate shown in Table 4, and a molten resin was discharged as a strand from the discharge port (L/D=100). In this case, a colorant was supplied together with the raw materials, and the time when the coloration of the extruded product became maximum was measured for obtaining the dwell time shown in Table 4. Further, the following screw constitution (called the screw constitution A) was employed. Kneading zones were established at seven places starting from the positions of L/D0=22, 28, 43, 55, 69, 77 and 93, and the lengths Lk/D0 of the respective kneading zones were Lk/D0=1.8, 1.8, 2.3, 2.3, 2.3, 2.3 and 3.0 in the corresponding order. On the downstream side in each kneading zone, a reverse screw region was established, and the lengths Lr/D0 of the respective reverse screw regions were Lr/D0=0.4, 0.4, 0.8, 0.8, 0.4, 0.8 and 0.4 in the corresponding order. Furthermore, the rate of the total length of the kneading zones to the entire screw length was calculated from (Total length of kneading zones)÷(Entire length of screw)×100, and was found to be 16%. Moreover, the value obtained by subtracting the resin pressure Pfmin (MPa) of the full flight zone with the minimum resin pressure among the resin pressures indicated by the resin pressure gauges installed in the multiple full flight zones from the resin pressure Pkmax (MPa) of the kneading zone with the maximum resin pressure among the resin pressures indicated by the resin pressure gauges installed in the multiple kneading zones, is shown in Table 4. Further, the molten resin discharged as a strand was passed through a cooling bath, to be cooled, and taken up and cut by a pelletizer, to obtain pellets of the thermoplastic resin composition as a sample. The sample was dried and specimens for evaluation were prepared by injection molding, to evaluate various properties. The results are shown in Table 5.

Comparative Examples 6 and 7

Melt kneading was performed to obtain thermoplastic resin compositions as described for Examples 4 and 5, except that the following screw constitution (called the screw constitution B) (kneading zones were established at seven places starting from the positions of L/D0=22, 28, 43, 55, 69, 77 and 93, and the lengths Lk/D0 of the respective kneading zones were Lk/D0=1.8, 1.8, 2.3, 2.3, 2.3, 2.3 and 3.0 in the corresponding order) was employed, and that no reverse screw regions were established. The kneading conditions are shown in Table 4, and the evaluation results of the obtained thermoplastic resin compositions are shown in Tables 5 and 6.

Comparative Example 8

Melt kneading was performed to obtain a thermoplastic resin composition as described for Examples 4 and 5, except that an unmodified polyethylene copolymer was used. The kneading conditions are shown in Table 4, and the evaluation results of the obtained thermoplastic resin composition are shown in Tables 5 and 6.

Example 6

Melt kneading was performed as described for Example 1, to obtain a thermoplastic resin composition, except that the thermoplastic resin composition was discharged from a sampling valve of L/D0=72 installed in the completely intermeshing twin-screw extruder having two double-start thread screws rotating in the same direction, with a screw diameter of 37 mm and L/D0=100 (TEM-37BS-26/2V produced by Toshiba Machine Co., Ltd.). The kneading conditions are shown in Table 4, and the evaluation results of the obtained thermoplastic resin composition are shown in Tables 5 and 6. Meanwhile, the rate (%) of the total length of the kneading zones to the entire screw length was calculated from (Total length of kneading zones)÷(Entire screw length)×100, and was found to be 15%.

Comparative Example 9

Melt kneading was performed as described for Example 6, to obtain a thermoplastic resin composition, except that the screw constitution B was employed. The kneading conditions are shown in Table 4, and the evaluation results of the obtained thermoplastic resin composition are shown in Tables 5 and 6.

Comparative Example 10

Melt kneading was performed as described for Comparative Example 9, to obtain a thermoplastic resin composition, except that the thermoplastic resin composition was discharged from a sampling valve of L/D0=40 installed in the completely intermeshing twin-screw extruder having two double-start thread screws rotating in the same direction, with a screw diameter of 37 mm and L/D0=100 (TEM-37BS-26/2V produced by Toshiba Machine Co., Ltd.). The kneading conditions are shown in Table 4, and the evaluation results of the obtained thermoplastic resin composition are shown in Tables 5 and 6. Meanwhile, the rate (%) of the total length of the kneading zones to the entire screw length was calculated from (Total length of kneading zones)÷(Entire screw length)×100, and was found to be 9%.

TABLE 4

|  | Thermoplastic resin (A) [parts by weight] | Reactive functional group-containing resin (B) [parts by weight] | Unmodified PE copolymer [parts by weight] | L/D of twin-screw extruder [—] | Screw constitution [—] | Screw rotation speed [rpm] | Extrusion rate [kg/h] | Extrusion rate per 1 rpm [kg/h] | Dwell time [min] | Pkmax-Pfmin [MPa] |
|---|---|---|---|---|---|---|---|---|---|---|
| Example 4 | 70 | 30 |  | 100 | A | 100 | 10 | 0.1 | 8 | 1.1 |
| Example 5 | 80 | 20 |  | 100 | A | 100 | 10 | 0.1 | 8 | 0.7 |
| Example 6 | 70 | 30 |  | 72 | A | 100 | 10 | 0.1 | 5 | 1.1 |
| Comparative Example 6 | 70 | 30 |  | 100 | B | 100 | 10 | 0.1 | 5 | 0.2 |
| Comparative Example 7 | 80 | 20 |  | 100 | B | 100 | 10 | 0.1 | 5 | 0.1 |
| Comparative Example 8 | 70 |  | 30 | 100 | A | 100 | 10 | 0.1 | 8 | 0.8 |
| Comparative Example 9 | 70 | 30 |  | 72 | B | 100 | 10 | 0.1 | 3.5 | 0.2 |
| Comparative Example 10 | 70 | 30 |  | 40 | B | 100 | 20 | 0.2 | 0.5 | 0.2 |

TABLE 5

|  | Relaxation time | | Resin of continuous phase [—] | Whether or not connective formations Cs are formed [—] | Rate of the area of connective formations Cs [%] | Tensile elastic modulus [GPa] | | | Tensile fracture elongation [%] | | |
|---|---|---|---|---|---|---|---|---|---|---|---|
|  | $T_1^{C1}$[sec] | $T_1^{C2}$[sec] |  |  |  | 100 mm/min | 500 mm/min | 1000 mm/min | 100 mm/min | 500 mm/min | 1000 mm/min |
| Example 4 | 50 | 9 | (A) | ○ | 38 | 1.4 | 1 | 0.8 | 141 | 167 | 175 |
| Example 5 | 55 | 11 | (A) | ○ | 27 | 1.7 | 1.2 | 1 | 157 | 176 | 184 |
| Example 6 | 57 | 12 | (A) | ○ | 24 | 1.5 | 1.2 | 1 | 138 | 151 | 162 |
| Comparative Example 6 | 68 | 19 | (A) | ○ | 9 | 1.5 | 1.4 | 1.2 | 135 | 142 | 150 |
| Comparative Example 7 | 71 | 22 | (A) | ○ | 6 | 1.9 | 1.7 | 1.6 | 142 | 153 | 162 |
| Comparative Example 8 | 86 | 35 | (A) | x | — | 1.4 | 1.6 | 1.7 | 30 | 28 | 25 |
| Comparative Example 9 | 73 | 24 | (A) | ○ | 7 | 1.6 | 1.5 | 1.4 | 131 | 139 | 145 |
| Comparative Example 10 | 78 | 28 | (A) | x | — | 1.6 | 1.7 | 1.8 | 128 | 121 | 115 |

TABLE 6

|  | High-speed tensile test (3.6 km/h, 20° C.) | | | High-speed tensile test (3.6 km/h, 20° C.) | | | | | |
| --- | --- | --- | --- | --- | --- | --- | --- | --- | --- |
|  | Yield strength [MPa] | Fracture elongation [%] | Impact absorbing energy [J] | Yield strength [MPa] | Fracture elongation [%] | Impact absorbing energy [J] | Impact strength [kJ/m2] | Deflection temperature under load [° C.] | tan δ [—] |
| Example 4 | 61 | 63 | 6 | 80 | 53 | 6.5 | 82 | 74 | 0.174 |
| Example 5 | 78 | 35 | 4.5 | 96 | 31 | 4.9 | 29 | 121 | 0.166 |
| Example 6 | 64 | 38 | 4.1 | 84 | 35 | 4.8 | 78 | 69 | 0.163 |
| Comparative Example 6 | 64 | 32 | 3.3 | 85 | 25 | 3.3 | 75 | 65 | 0.157 |
| Comparative Example 7 | 83 | 22 | 2.7 | 103 | 18 | 3.3 | 25 | 115 | 0.145 |
| Comparative Example 8 | 75 | 15 | 1.9 | 101 | 10 | 1.7 | 67 | 58 | 0.118 |
| Comparative Example 9 | 66 | 28 | 3.1 | 88 | 23 | 3.3 | 70 | 59 | 0/141 |
| Comparative Example 10 | 69 | 22 | 2.5 | 91 | 20 | 2.9 | 63 | 57 | 0.123 |

With regard to Examples 4, 5 and 6, in each of the thermoplastic resin compositions, the longer relaxation time T1C1 among the two relaxation times in the two-component analysis of the relaxation time corresponding to the carbon of each carbonyl group, and the longer relaxation time T1C2 among the two relaxation times in the two-component analysis of the relaxation time corresponding to the carbon of the hydrocarbon group adjacent to each NH group, were short. Therefore, the tensile elastic modulus remarkably declined, and tensile fracture elongation also greatly increased. Further, in the high-speed tensile tests, the impact absorbing energy values at 20° C. and −20° C. were large, and the balance between impact resistance and heat resistance was excellent, tan δ being large. Therefore, the vibration energy absorbing performance was also excellent. On the other hand, with regard to Comparative Examples 6, 7 and 9, in each of the conventional thermoplastic resin compositions, since T1C1 and T1C2 were larger than those of Examples 4 to 6, the tensile elastic modulus declined, and the tensile fracture elongation increased, though not so greatly, with the increase of the stress rate in the tensile tests. Further, compared with the properties of the thermoplastic resin compositions of Examples 4 to 6 in conformity with this disclosure, the impact absorbing energy in the high-speed tensile test was small, and the balance between impact resistance and heat resistance was poor, tan δ being small. Therefore, the vibration energy absorbing performance was also poor.

Furthermore, with regard to Comparative Examples 8 and 10, in each of the conventional thermoplastic resin compositions, since T1C1 and T1C2 were very larger than those of Examples 4 to 6, the tensile elastic modulus increased, and the tensile fracture elongation also declined with the increase of the stress rate in the tensile tests. Moreover, compared with the properties of the thermoplastic resin composition of Example 4 in conformity with this disclosure, the impact absorbing energy in the high-speed tensile test greatly declined, and the balance between impact resistance and heat resistance became greatly poor, tan δ being small. Therefore, the vibration energy absorbing performance was also very poor.

As can be seen from these results, if the relaxation time of the polyamide resin in a thermoplastic resin composition containing, the polyamide resin is controlled, the balance between contradictory properties such as impact resistance and heat resistance becomes excellent, and a peculiar viscoelastic behavior not observed with the conventional polymeric materials can be remarkably exhibited. Further, the impact energy absorbing performance and the vibration energy absorbing performance at the time of high-speed deformation become remarkably excellent.

Examples 7 and 8

The nylon 6 resin with a water content of 500 ppm (A-1) was used as the thermoplastic resin (A), and the GMA modified PE copolymer (B-1) was used as the reactive functional group-containing resin (B). They were mixed at each mixing ratio shown in Table 7, and while nitrogen flow was effected by a vacuum pump, a completely intermeshing twin-screw extruder having two double-start thread screws rotating in the same direction, with a screw diameter of 37 mm and L/D0=100 (TEM-37BS-26/2V produced by Toshiba Machine Co., Ltd.) was used to perform melt-kneading at a cylinder temperature of 260° C. and at the screw rotation speed and the extrusion rate shown in Table 7, and a molten resin was discharged as a strand from the discharge port (L/D=100). In this case, a colorant was supplied together with the raw materials, and the time when the coloration of the extruded product became maximum was measured for obtaining the dwell time shown in Table 7. Further, the following screw constitution (called the screw constitution A) was employed. Kneading zones were established at seven places starting from the positions of L/D0=22, 28, 43, 55, 69, 77 and 93, and the lengths Lk/D0 of the respective kneading zones were Lk/D0=1.8, 1.8, 2.3, 2.3, 2.3, 2.3 and 3.0 in the corresponding order. On the downstream side in each kneading zone, a reverse screw region was established, and the lengths Lr/D0 of the respective reverse screw regions were Lr/D0=0.4, 0.4, 0.8, 0.8, 0.4, 0.8 and 0.4 in the corresponding order. Furthermore, the rate of the total length of the kneading zones to the entire screw length, was calculated from (Total length of kneading zones)÷(Entire length of screw)×100, and was found to be 16%. Moreover, the value obtained by subtracting the resin pressure Pfmin (MPa) of the full flight zone with the minimum resin pressure among the resin pressures indicated by the resin pressure gauges installed in the multiple full flight zones from the resin pressure Pkmax (MPa) of the kneading zone with the maximum resin pressure among the resin pressures indicated by the resin pressure gauges installed in the multiple kneading zones, is shown in Table 7. Resin temperatures were measured by the resin thermometers installed uniformly at multiple places of the extruder, and the highest resin temperature among them is shown in Table 7 as the highest resin temperature. Further, a vent vacuum zone was established at a position of L/D0=96, to remove the volatile component at a gauge pressure of −0.1 MPa. The molten resin discharged as a strand was passed through a cooling bath, to be cooled, and taken up and cut by a pelletizer, to obtain pellets of the thermoplastic resin composition as a sample. The sample was dried in vacuum at 80° C. for more than 12 hours, and injection molding and extrusion molding as described before were performed for evaluating various properties. The kneading conditions and the results of various evaluations are shown in Table 7.

Figure 5:
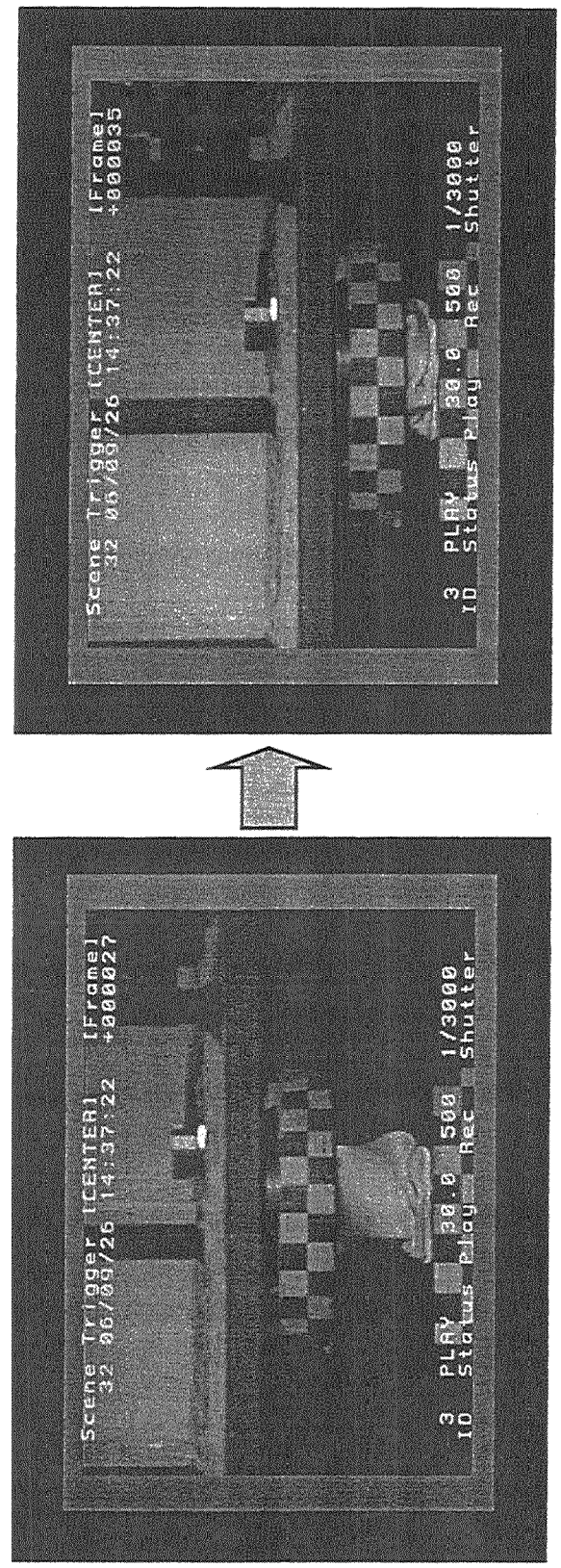
FIG. 5 is photos showing scenes of the large-load high-speed free fall drop impact test performed in Example 7 in conformity with this disclosure.

Scenes of the large-load high-speed free fall drop impact test of Example 7 in conformity with this disclosure are shown in the photos of FIG. 5. According to FIG. 5, it can be seen that the molded article per se did not have cracks of 5 cm or more even in the large-load high-speed free fall drop impact test.

Example 9

Melt kneading was performed as described for Example 7, to obtain a thermoplastic resin composition, except that the thermoplastic resin composition was discharged from a sampling valve of L/D0=72 installed in the completely intermeshing twin-screw extruder having two double-start thread screws rotating in the same direction, with a screw diameter of 37 mm and L/D0=100 (TEM-37BS-26/2V produced by Toshiba Machine Co., Ltd.) and that a vent vacuum zone was established at a position of L/D0=68, to remove the volatile component at a gauge pressure of −0.1 MPa. The kneading conditions and the results of various evaluations are shown in Table 7. Meanwhile, the rate (%) of the total length of the kneading zones to the entire screw length was calculated from (Total length of kneading zones)÷(Entire screw length)×100, and was found to be 15%.

Example 10

Melt kneading was performed as described for Example 7, to obtain a thermoplastic resin composition, except that the gauge pressure in the vent vacuum zone was set at −0.05 MPa. The kneading conditions and the results of various evaluations are shown in Table 7.

Example 11

Melt kneading was performed as described for Example 7, to obtain a thermoplastic resin composition, except that the nylon 6 resin with a water content of 7,000 ppm (A-2) was used as the thermoplastic resin (A). The kneading conditions and the results of various evaluations are shown in Table 7.

Example 12

Melt kneading was performed as described for Example 7, to obtain a thermoplastic resin composition, except that the cylinder temperature was set at 330° C. to perform the melt kneading. The kneading conditions and the results of various evaluations are shown in Table 7.

Example 13

Melt kneading was performed as described for Example 7, to obtain a thermoplastic resin composition, except that the maleic anhydride modified ethylene-1-butene copolymer (B-2) was used as the reactive functional group-containing resin (B). The kneading conditions and the results of various evaluations are shown in Table 7.

Comparative Examples 11 and 12

Melt kneading was performed as described for Examples 7 and 8, to obtain thermoplastic resin compositions, except that the screw constitution B (kneading zones were established at seven places starting from the positions of L/D0=22, 28, 43, 55, 69, 77 and 93, and the lengths Lki/D0 of the respective kneading zones were Lk/D0=1.8, 1.8, 2.3, 2.3, 2.3, 2.3 and 3.0 in the corresponding order) was employed, that no reverse screen regions were established, and that the gauge pressure in the vent vacuum zone was −0.05 MPa. The kneading conditions and the results of various evaluations are shown in Table 7.

Comparative Example 13

Melt kneading was performed as described for Example 9, to obtain a thermoplastic resin composition, except that the screw constitution B was employed and that the gauge pressure in the vent vacuum zone was −0.05 MPa. The kneading conditions and the results of various evaluations are shown in Table 7.

Comparative Example 14

Melt kneading was performed as described for Comparative Example 11, to obtain a thermoplastic resin composition, except that the screw constitution B was employed, that the thermoplastic resin composition was discharged from a sampling valve of L/D0=40 installed in the completely intermeshing twin-screw extruder having two double-start thread screws rotating in the same direction, with a screw diameter of 37 mm and L/D0=100 (TEM-37BS-26/2V produced by Toshiba Machine Co., Ltd.), that a vent vacuum zone was established at a position of L/D0=36 to remove the volatile component at a gauge pressure of −0.05 MPa, and that the thermoplastic resin composition was discharged at an extrusion rate of 20 kg/h. The kneading conditions and the results of various evaluations are shown in Table 7. Meanwhile, the rate (%) of the total length of the kneading zones to the entire screw length was calculated from (Total length of kneading zones)÷(Entire screw length)×100, and was found to be 9%.

Comparative Example 15

Melt kneading was performed as described for Example 10, to obtain a thermoplastic resin composition, except that the unmodified PE copolymer (C-1) was used instead of the reactive functional group-containing resin (B). The kneading conditions and the results of various evaluations are shown, in Table 7.

Comparative Example 16

Melt kneading was performed as described for Comparative Example 14, to obtain a thermoplastic resin composition, except that the ethylene-methacrylic acid-zinc methacrylate copolymer (B-3) was used as the reactive functional group-containing resin. The kneading conditions and the results of various evaluations are shown in Table 7.

Figure 6:
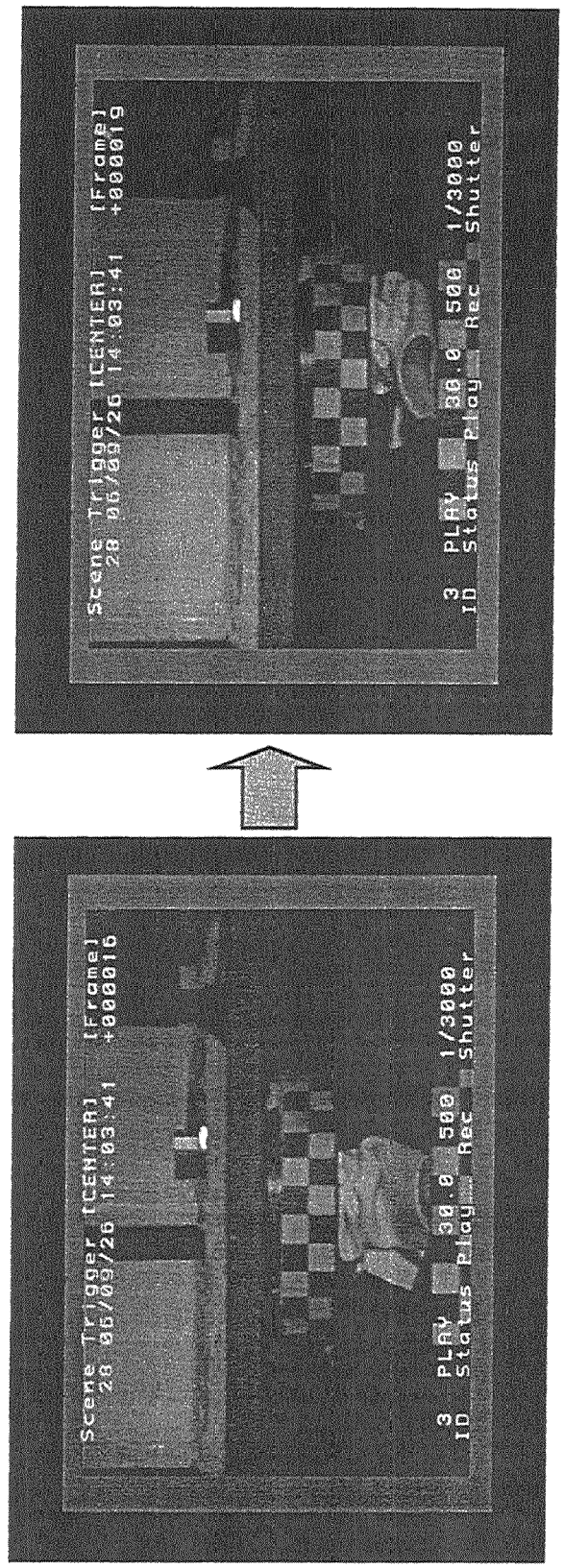
FIG. 6 is photos showing scenes of the large-load high-speed free fall drop impact test performed in Comparative Example 16 not in conformity with this disclosure.

Scenes of the large-load high-speed free fall drop impact test of Comparative Example 16 not in conformity with this disclosure are shown in the photos of FIG. 6. According to FIG. 6, it can be seen that the molded article per se had cracks of 5 cm or more in the large-load high-speed free fall drop impact test.

Comparative Example 17

The results of various evaluations of the thermoplastic polyurethane (D-1) as a typical impact absorbing material are shown in Table 7.

TABLE 7

| | | | | | Example | | | | | | | Comparative Example |
|---|---|---|---|---|---|---|---|---|---|---|---|---|
| | | | | | 7 | 8 | 9 | 10 | 11 | 12 | 13 | 11 |
| Mixing ratio | Thermoplastic resin (A) | A-1 | Water content 500 ppm | Parts by weight | 70 | 60 | 70 | 70 | | 70 | 70 | 70 |
| | | A-2 | Water content 7000 ppm | Parts by weight | | | | | 70 | | | |
| | Reactive functional group-containing resin (B) | B-1 | Water content 200 ppm | Parts by weight | 30 | 40 | 30 | 30 | 30 | 30 | | 30 |
| | | B-2 | Water content 200 ppm | Parts by weight | | | | | | | 30 | |
| | | B-3 | Water content 200 ppm | Parts by weight | | | | | | | | |
| | Unmodified PE copolymer | C-1 | Water content 200 ppm | Parts by weight | | | | | | | | |
| | Thermoplastic polyurethane | D-1 | Water content 200 ppm | Parts by weight | | | | | | | | |
| Melt kneading | L/D of twin-screw extuder | | | — | 100 | 100 | 72 | 100 | 100 | 100 | 100 | 100 |
| | Screw constitution | | | — | A | A | A | A | A | A | A | B |
| | Screw rotation speed | | | rpm | 100 | 100 | 100 | 100 | 100 | 100 | 100 | 100 |
| | Extrusion rate | | | kg/h | 10 | 10 | 10 | 10 | 10 | 10 | 10 | 10 |
| | Extrusion rate per 1 rpm | | | kg/h | 0.1 | 0.1 | 0.1 | 0.1 | 0.1 | 0.1 | 0.1 | 0.1 |
| | Dwell time | | | min | 8 | 8 | 5 | 8 | 8 | 8 | 8 | 5 |
| | Pkmax-Pfmin | | | MPa | 1.1 | 1.3 | 1.1 | 1.1 | 1.1 | 0.5 | 1.0 | 0.2 |
| | Maximum resin temperature | | | °C. | 276 | 278 | 276 | 276 | 276 | 335 | 276 | 265 |
| | Gauge pressure in vacuum zone | | | MPa | −0.1 | −0.1 | −0.1 | −0.05 | −0.1 | −0.1 | −0.1 | −0.05 |
| Morphology | Resin of continuous phase | | | — | A | A | A | A | A | A | A | A |
| | Whether or not connective formations Cs are formed | | | — | ○ | ○ | ○ | ○ | ○ | ○ | ○ | ○ |
| | Rate of the area of connective formations Cs | | | % | 38 | 39 | 28 | 34 | 32 | 31 | 37 | 5 |
| Performance as specimens | Tensile elastic modulus | 100 mm/min | | % | 1.3 | 1.1 | 1.5 | 1.4 | 1.4 | 1.5 | 1.3 | 1.5 |
| | | 500 mm/min | | % | 1.0 | 0.9 | 1.1 | 1.0 | 1.0 | 1.1 | 1.0 | 1.4 |
| | | 1000 mm/min | | % | 0.7 | 0.7 | 1.0 | 0.8 | 0.8 | 0.9 | 0.7 | 1.2 |
| | Tensile fracture elongation | 100 mm/min | | % | 150 | 90 | 140 | 141 | 144 | 141 | 148 | 135 |
| | | 500 mm/min | | % | 172 | 103 | 155 | 157 | 168 | 160 | 170 | 142 |
| | | 1000 mm/min | | % | 182 | 110 | 168 | 175 | 177 | 167 | 160 | 150 |
| | Impact strength | | | kJ/m² | 83 | 82 | 76 | 82 | 82 | 79 | 84 | 75 |
| | Deflection temperature under load | | | °C. | 76 | 61 | 68 | 74 | 74 | 72 | 75 | 85 |
| Large-load high-speed free fall drop impact test | Maximum point load | | | kN | 12 | 10 | 13 | 15 | 15 | 17 | 13 | 21 |
| | Whether or not cracks of 5 cm or more occurred | | | — | Did not occur | Did not occur | Did not occur | Did not occur | Did not occur | Did not occur | Did not occur | Occurred |

| | | | | | Comparative Example | | | | | |
|---|---|---|---|---|---|---|---|---|---|---|
| | | | | | 12 | 13 | 14 | 15 | 16 | 17 |
| Mixing ratio | Thermoplastic resin (A) | A-1 | Water content 500 ppm | Parts by weight | 60 | 70 | 70 | 70 | 60 | |
| | | A-2 | Water content 7000 ppm | Parts by weight | | | | | | |
| | Reactive functional group-containing resin (B) | B-1 | Water content 200 ppm | Parts by weight | 40 | 30 | 30 | | | |
| | | B-2 | Water content 200 ppm | Parts by weight | | | | | | |
| | | B-3 | Water content 200 ppm | Parts by weight | | | | | 40 | |
| | Unmodified PE copolymer | C-1 | Water content 200 ppm | Parts by weight | | | | 30 | | |
| | Thermoplastic polyurethane | D-1 | Water content 200 ppm | Parts by weight | | | | | | 100 |

TABLE 7-continued

| | | | | | | | | |
|---|---|---|---|---|---|---|---|---|
| Melt kneading | L/D of twin-screw extuder | — | 100 | 72 | 40 | 100 | 40 | |
| | Screw constitution | | B | B | B | A | B | |
| | Screw rotation speed | rpm | 100 | 100 | 100 | 100 | 100 | |
| | Extrusion rate | kg/h | 10 | 10 | 20 | 10 | 20 | |
| | Extrusion rate per 1 rpm | kg/h | 0.1 | 0.1 | 0.2 | 0.1 | 0.2 | |
| | Dwell time | min | 5 | 3.5 | 0.5 | 8 | 0.5 | |
| | Pkmax-Pfmin | MPa | 0.2 | 0.2 | 0.2 | 0.5 | 0.2 | |
| | Maximum resin temperature | °C. | 265 | 265 | 262 | 278 | 262 | |
| | Gauge pressure in vacuum zone | MPa | −0.05 | −0.05 | −0.05 | −0.05 | −0.05 | |
| Morphology | Resin of continuous phase | — | A | A | A | A | A | |
| | Whether or not connective formations Cs are formed | — | ○ | ○ | x | x | x | |
| | Rate of the area of connective formations Cs | % | 7 | 5 | — | — | — | |
| Performance as specimens | Tensile elastic modulus | 100 mm/min | % | 1.3 | 1.5 | 1.8 | 1.4 | 1.7 | 0.1 |
| | | 500 mm/min | % | 1.2 | 1.6 | 1.7 | 1.5 | 1.7 | 0.2 |
| | | 1000 mm/min | % | 1.0 | 1.4 | 1.8 | 1.7 | 1.8 | 0.2 |
| | Tensile fracture elongation | 100 mm/min | % | 80 | 131 | 128 | 30 | 104 | 407 |
| | | 500 mm/min | % | 56 | 139 | 121 | 28 | 68 | 306 |
| | | 1000 mm/min | % | 89 | 145 | 115 | 25 | 38 | 296 |
| | Impact strength | kJ/m$^2$ | 75 | 70 | 63 | 67 | 96 | 55 |
| | Deflection temperature under load | °C. | 54 | 59 | 57 | 58 | 59 | <20 |
| Large-load high-speed free fall drop impact test | Maximum point load | kN | 17 | 22 | 23 | 24 | 23 | 5 |
| | Whether or not cracks of 5 cm or more occurred | — | Occurred | Occurred | Occurred | Occurred | Occurred | Did not occur |

TABLE 8

| | | | | | Example | | | | Comparative Example | | | |
|---|---|---|---|---|---|---|---|---|---|---|---|---|
| | | | | | 14 | 15 | 16 | 17 | 18 | 19 | 20 | 21 |
| Mixing ratio | Thermoplastic resin (A) | A-3 | Water content 500 ppm | Parts by weight | 70 | | | | 70 | | | |
| | | A-4 | Water content 500 ppm | Parts by weight | | 70 | | | | 70 | | |
| | | A-5 | Water content 500 ppm | Parts by weight | | | 70 | | | | 70 | |
| | | A-6 | Water content 100 ppm | Parts by weight | | | | 70 | | | | 70 |
| | Reactive functional group-containing resin (B) | B-1 | Water content 200 ppm | Parts by weight | 30 | 30 | 30 | 30 | 30 | 30 | 30 | 30 |
| Melt kneading | L/D of twin-screw extruder | | — | | 100 | 100 | 100 | 100 | 100 | 100 | 100 | 100 |
| | Screw constitution | | — | | A | A | A | A | B | B | B | B |
| | Screw rotation speed | | rpm | | 100 | 100 | 100 | 100 | 100 | 100 | 100 | 100 |
| | Extrusion rate | | kg/h | | 10 | 10 | 10 | 10 | 10 | 10 | 10 | 20 |
| | Extrusion rate per 1 rpm | | kg/h | | 0.1 | 0.1 | 0.1 | 0.1 | 0.1 | 0.1 | 0.1 | 0.1 |
| | Dwell time | | min | | 8 | 8 | 8 | 8 | 5 | 5 | 5 | 5 |
| | Pkmax-Pfmin | | MPa | | 1.0 | 1.1 | 0.9 | 1.0 | 0.2 | 0.2 | 0.2 | 0.2 |
| | Maximum resin temperature | | °C. | | 292 | 276 | 235 | 273 | 282 | 266 | 225 | 263 |
| | Gauge pressure in vacuum zone | | MPa | | −0.1 | −0.1 | −0.1 | −0.1 | −0.05 | −0.05 | −0.05 | −0.05 |
| Morphology | Resin of continuous phase | | — | | A | A | A | A | A | A | A | A |
| | Whether or not connective formations Cs are formed | | — | | ○ | ○ | ○ | ○ | ○ | ○ | ○ | ○ |
| | Rate of the area of connective formations Cs | | % | | 37 | 37 | 35 | 32 | 6 | 7 | 5 | 5 |
| Performance as specimens | Tensile elastic modulus | 100 mm/min | % | | 1.4 | 1.2 | 0.8 | 1.5 | 1.5 | 1.3 | 0.9 | 1.6 |
| | | 500 mm/min | % | | 1.1 | 1.0 | 0.6 | 1.3 | 1.4 | 1.2 | 0.8 | 1.5 |
| | | 1000 mm/min | % | | 0.8 | 0.7 | 0.5 | 1.1 | 1.1 | 1.1 | 0.7 | 1.4 |
| | Tensile fracture elongation | 100 mm/min | % | | 125 | 155 | 126 | 141 | 110 | 121 | 110 | 110 |
| | | 500 mm/min | % | | 143 | 176 | 135 | 160 | 120 | 139 | 115 | 121 |
| | | 1000 mm/min | % | | 160 | 185 | 145 | 167 | 125 | 146 | 122 | 128 |
| | Impact strength | | kJ/m$^2$ | | 76 | 82 | 79 | 79 | 70 | 74 | 70 | 70 |
| | Deflection temperature under load | | °C. | | 85 | 65 | 52 | 72 | 75 | 60 | 46 | 62 |
| Large-load high-speed free fall drop impact test | Maximum point load | | kN | | 14 | 11 | 10 | 14 | 22 | 20 | 19 | 23 |
| | Whether or not cracks of 5 cm or more occurred | | — | | Did not occur | Did not occur | Did not occur | Did not occur | Occurred | Occurred | Occurred | Occurred |

With regard to Examples 7 to 13, each of the thermoplastic resin compositions in conformity with this disclosure had sufficient heat resistance at room temperature, and even in the aforementioned high-speed free fall drop impact test, the maximum point load acting on the object protected by the thermoplastic resin composition was as low as less than 20 kilonewtons, and the molded article was not greatly fractured since no cracks of 5 cm or more occurred in the molded article per se. Therefore, the thermoplastic resin composition was excellent for application as impact absorbing members. It is important that the resin pressure, vent vacuum pressure, water content and resin temperature during melt kneading are controlled for performing melt kneading. As a result, three-dimensionally connective structures Cs containing a continuous phase component were formed in the respective dispersed phase particles of a dispersed phase, and the rate of the area of the connective structures Cs occupying the section of each dispersed phase particle Dp with an average particle size of 1,000 nm or less became large. Further, also in the tensile tests using specimens, the tensile elastic modulus remarkably declined and the tensile fracture elongation also greatly increased with the increase of the stress rate.

On the other hand, in each of the conventional thermoplastic resin compositions described in Comparative Examples 11 to 13, the melt kneading conditions were not controlled in a sophisticated manner. Therefore, though three-dimensionally connective structures Cs containing a continuous phase component were formed in the respective dispersed phase particles of a dispersed phase, the rate of the area of the connective structures Cs occupying the section of each dispersed phase particle Dp with an average particle size of 1,000 nm or less was small, and in the aforementioned large-load high-speed free fall drop impact test, the maximum point load acting on the object protected by the conventional thermoplastic resin composition was high, and cracks of 5 cm or more occurred in the molded article per se, though the impact strength as specimens was high. Further, also in the tensile tests using specimens, the tensile elastic modulus declined and the tensile fracture elongation increased though not to a large extent, with the increase of the stress rate.

Furthermore, in each of the conventional thermoplastic resin compositions described in Comparative Examples 14 to 16, since the melt kneading conditions were not controlled in a sophisticated manner, three-dimensionally connective structures Cs containing a continuous phase component were not formed in the respective dispersed phase particles of a dispersed phase, and in the aforementioned large-load high-speed free fall drop impact test, the maximum point load acting on the object protected by the conventional thermoplastic resin was high and cracks of 5 cm or more occurred in the molded article per se. Furthermore, in the tensile tests using specimens, the tensile elastic modulus increased and the tensile fracture elongation declined with the increase of the stress rate.

With regard to the thermoplastic polyurethane as a typical impact absorbing material stated in Comparative Example 17, in the aforementioned large-load high-speed free fall drop impact test, the maximum point load acting on the object protected by the thermoplastic polyurethane was as low as less than 20 kilonewtons, and no cracks of 5 cm or more occurred in the molded article per se. However, since the deflection temperature under load was as low as lower than 20° C., it can be seen that the thermoplastic polyurethane is likely to be limited in the usable range.

Example 14

Melt kneading was performed as described for Example 7, to obtain a thermoplastic resin composition, except that the nylon 66 resin with a water content of 500 ppm (A-3) was used as the thermoplastic resin (A) and that the cylinder temperature was set at 280° C. for performing melt kneading. The kneading conditions and the results of various evaluations are shown in Table 8.

Example 15

Melt kneading was performed as described for Example 7, to obtain a thermoplastic resin composition, except that the nylon 610 resin with a water content of 500 ppm (A-4) was used as the thermoplastic resin (A). The kneading conditions and the results of various evaluations are shown in Table 8.

Example 16

Melt kneading was performed as described for Example 7, to obtain a thermoplastic resin composition, except that the nylon 11 resin with a water content of 500 ppm (A-5) was used as the thermoplastic resin (A) and that the cylinder temperature was set at 220° C. for performing melt kneading. The kneading conditions and the results of various evaluations are shown in Table 8.

Example 17

Melt kneading was performed as described for Example 7, to obtain a thermoplastic resin composition, except that the polybutylene terephthalate resin with a water content of 100 ppm (A-6) was used as the thermoplastic resin (A). The kneading conditions and the results of various evaluations are shown in Table 8.

Comparative Example 18

Melt kneading was performed as described for Comparative Example 11, to obtain a thermoplastic resin composition, except that the nylon 66 resin with a water content of 500 ppm (A-3) was used as the thermoplastic resin (A) and that the cylinder temperature was set at 280° C. for performing melt kneading. The kneading conditions and the results of various evaluations are shown in Table 8.

Comparative Example 19

Melt kneading was performed as described for Comparative Example 11, to obtain a thermoplastic resin composition, except that the nylon 610 resin with a water content of 500 ppm (A-4) was used as the thermoplastic resin (A). The kneading conditions and the results of various evaluations are shown in Table 8.

Comparative Example 20

Melt kneading was performed as described for Comparative Example 11, to obtain a thermoplastic resin composition, except that the nylon 11 resin with a water content of 500 ppm (A-5) was used as the thermoplastic resin (A) and that the cylinder temperature was set at 220° C. for performing melt kneading. The kneading conditions and the results of various evaluations are shown in Table 8.

Comparative Example 21

Melt kneading was performed as described for Comparative Example 11, to obtain a thermoplastic resin composition, except that the polybutylene terephthalate resin with a water content of 100 ppm (A-6) was used as the thermoplastic resin (A). The kneading conditions and the results of various evaluations are shown in Table 8.

With regard to Examples 14 to 17, even in the case where different resins were used as the thermoplastic resin (A), since the resin pressure, vent vacuum pressure, water content and resin temperature during melt kneading were controlled, three-dimensionally connective structures Cs containing a continuous phase component were formed in the respective dispersed phase particles of a dispersed phase, and the rate of the area of the connective structures Cs occupying the section of each dispersed phase particle Dp with an average particle size of 1,000 or less could be made larger. As a result, the thermoplastic resin composition had sufficient heat resistance even at room temperature. Further, also in the large-load high-speed free fall drop impact test, the maximum point load acting on the object protected by the thermoplastic resin composition was as low as less than 20 kilonewtons, and no cracks of 5 cm or more occurred in the molded article per se. Thus, the thermoplastic resin composition obtained was excellent for application as impact absorbing members.

On the other hand, in each of the conventional thermoplastic resin compositions described in Comparative Examples 18 to 21, the melt kneading conditions were not controlled in a sophisticated manner. Therefore, though three-dimensionally connective structures Cs containing a continuous phase component were formed in a dispersed phase, the rate of the area of the connective structures Cs occupying the section of each dispersed phase particle Dp with an average particle size of 1,000 nm or less was small. Further, in the aforementioned large-load high-speed free fall drop impact test, the maximum point load acting on the object protected by the conventional thermoplastic resin composition was high, and cracks of 5 cm or more occurred in the molded article per se, though the impact strength as specimens was high.

From these results, it can be seen that if a thermoplastic resin composition containing a thermoplastic resin (A) and a reactive functional group-containing resin (B) is melt-kneaded using a twin-screw extruder with the ratio L/D0 of the screw length L to the screw diameter D0 set at 50 or more, while the resin pressure, vent vacuum pressure, water content and resin temperature are controlled to perform melt kneading, then the structure in the dispersed phase can be controlled in a sophisticated manner, and the obtained thermoplastic resin composition has sufficient heat resistance even at room temperature and allows a low maximum load to act on the object protected by it, without being greatly fractured even if it is subjected to a large-load high-speed impact. Therefore, the thermoplastic resin composition is excellent for application as impact absorbing members.

INDUSTRIAL APPLICABILITY

The resin composition can be molded into articles, films, fibers, etc., and these molded articles can be used as parts of electric and electronic fields, parts of automobile fields, architectural materials, various films and sheets, clothing and sport-related articles.

The invention claimed is:

1. A thermoplastic resin composition comprising a thermoplastic resin (A) which is at least one selected from polyamide resins, polyester resins, polyphenylene sulfide resins, polyphenylene oxide resins and polycarbonate resins and a reactive functional group-containing resin (B) having a molecular chain, wherein reactive functional groups of the reactive functional group-containing resin (B) are at least one selected from amino groups, carboxyl groups, carboxyl metal salt, epoxy groups, acid anhydride groups and oxazoline groups, and the resin (B) has the reactive functional groups in the molecular chain, wherein the morphology of said resin composition observed by transmission electron microscopy tomography is such that either the resin (A) or the resin (B) forms a continuous phase, while the other resin forms a dispersed phase, that three-dimensionally connective structures (Cs) containing said continuous phase component are formed in the respective dispersed phase particles of said dispersed phase, and the area of said connective structures (CS) occupying a section of each dispersed phase particle Dp with an average particle size of 1,000 nm or less of said dispersed phase is 10% or more.

2. The thermoplastic resin composition according to claim 1, wherein said thermoplastic resin (A) is a polyamide resin.

3. The thermoplastic resin composition according to claim 1, wherein the reactive functional group-containing resin (B) is a rubbery polymer.

4. The thermoplastic resin composition according to claim 1, wherein in the case where JIS 5A dumbbell specimens (75 mm long, 12.5 mm wide at ends, and 2 mm thick) produced by injection-molding the resin composition are tensile-tested, the molded specimens have a property of E(V1)>E(V2), if V1<V2, where E(V1) and E(V2) are tensile elastic modulus values at stress rates of V1 and V2.

5. The thermoplastic resin composition according to claim 4, wherein when the molded specimens are tensile-tested, the molded specimens satisfy $\epsilon(V1)<\epsilon(V2)$, if V1<V2, wherein $\epsilon(V1)$ and $\epsilon(V2)$ are tensile fracture elongation values at stress rates of V1 and V2.

6. The thermoplastic resin composition according to claim 1, wherein JIS No. 1 strip specimens (10 mm wide, 80 mm long and 4 mm thick) produced by injection-molding the resin composition have a deflection temperature under load of 50° C. or higher at 0.45 MPa; and when a cone with a mass of 193 kg is allowed to freely fall from a drop height of 0.5 m onto a cylinder with an outermost diameter of 50 mm, a wall thickness of 2 mm and a height of 150 mm obtained by molding the resin composition, the maximum point load acting on the cone is less than 20 kilonewtons, while cracks of 5 cm or more do not occur in the cylinder.

7. A method for producing the thermoplastic resin composition as set forth in claim 1, in which the thermoplastic resin (A) and the reactive functional group-containing resin (B) are melt-kneaded by a twin-screw extruder of 50 or more in the ratio L/D0 of screw length L to screw diameter D0, wherein the screws of said twin-screw extruder have full flight zones and kneading zones at multiple places; and the melt kneading is performed at a condition of Pkmax≧Pfmin+0.3, where Pkmax (MPa) is the maximum resin pressure among the resin pressures in the kneading zones of the screws, and Pfmin (MPa) is the minimum resin pressure among the resin pressures in the full flight zones of the screws.

8. The method for producing the thermoplastic resin composition according to claim 7, wherein the melt kneading is performed under such conditions that the dwell time of the raw materials in said twin-screw extruder from their supply to extrusion is 1 minute to 30 minutes and that the extrusion rate per 1 rpm of the screws is 0.01 kg/h or more.

9. The method for producing the thermoplastic resin composition, according to claim 7, wherein the screws of said twin-screw extruder are completely intermeshing screws rotating in the same direction.

10. The method for producing the thermoplastic resin composition according to claim 7, wherein the total length of said kneading zones is equal to 5 to 50% of said screw length.

11. The method for producing the thermoplastic resin composition according to claim 7, wherein the respective lengths Lk of said kneading zones satisfy Lk/D0=0.2 to 10.

12. The method for producing the thermoplastic resin composition according to claim 7, wherein said twin-screw extruder has a vent vacuum zone; and the pressure in the vent vacuum zone is reduced to a gauge pressure of −0.07 MPa or less, when melt kneading is performed.

13. The method for producing the thermoplastic resin composition according to claim 7, wherein raw materials with a water content of less than 5,000 ppm are used when melt-kneading is performed.

14. The method for producing the thermoplastic resin composition according to claim 7, wherein the highest resin temperature is controlled at 180° C. to 330° C. when melt kneading is performed.

15. A molded article produced by molding the thermoplastic resin composition obtained by the production method as set forth in claim 7.

16. A molded article produced by molding the thermoplastic resin composition as set forth in claim 1.

17. The molded article according to claim 16, wherein the molded article is at least one selected from the group consisting of films, sheets and fibers.

18. The molded article according to claim 16, wherein the molded article is at least one selected from the group consisting of automobile parts, architectural materials, sporting goods and electric and electronic parts.

19. The molded article according to claim 16, wherein the molded article is an impact absorbing member.

20. A thermoplastic resin composition comprising a polyamide resin (A1) which is at least one selected from polyamide resins, polyester resins, polyphenylene sulfide resins, polyphenylene oxide resins and polycarbonate resins and a reactive functional group-containing resin (B), having a molecular chain, wherein reactive functional groups of the reactive functional group-containing resin (B) are at least one selected from amino groups, carboxyl groups, carboxyl metal salt, epoxy groups, acid anhydride groups and oxazoline groups, and the resin (B) has the reactive functional groups in the molecular chain, wherein in a relaxation time T1C of each carbon nucleus as measured by solid NMR measurement, a longer relaxation time T1C among two relaxation times in a two-component analysis of a relaxation time corresponding to a carbon of each carbonyl group of the polyamide resin (A1) is 65 seconds or less, and a longer relaxation time T1C2 among two relaxation times in a two-component analysis of a relaxation time corresponding to a carbon of the hydrocarbon group adjacent to each NH group of the polyamide resin (A1) is 15 seconds or less.

21. The thermoplastic resin composition according to claim 20, wherein the polyamide resin (A1) is polyamide 6.

* * * * *

UNITED STATES PATENT AND TRADEMARK OFFICE
CERTIFICATE OF CORRECTION

| | |
|---|---|
| PATENT NO. | : 7,960,473 B2 |
| APPLICATION NO. | : 12/293697 |
| DATED | : June 14, 2011 |
| INVENTOR(S) | : Kobayashi et al. |

It is certified that error appears in the above-identified patent and that said Letters Patent is hereby corrected as shown below:

IN THE SPECIFICATIONS:

In Column 44

At Table 7, at Example 9, row 34, please change "168" to --166--; at Example 13, row 34, please change "160" to --180--; and at Comparative Example 11, row 28, please change "5" to --6--.

In Column 46

At Table 7-continued, at Comparative Example 12, row 8, please change "265" to --266-- and at row 19, please change "56" to --86--; at Comparative Example 13, row 15, please change "1.5" to --1.6--, and at row 16, please change "1.6" to --1.5--; at Comparative Example 14, at row 15, please change "1.8" to --1.6--; at Comparative Example 15, at row 16, please change "1.5" to --1.6--; at Comparative Example 16, at row 20, please change "38" to --36--; and at Comparative Example 17, at row 20, please change "296" to --298--.

IN THE CLAIMS:

In Column 52

At line 17, claim 20, please change "T1C" to --T1C1--.

Signed and Sealed this
Twentieth Day of December, 2011

David J. Kappos
*Director of the United States Patent and Trademark Office*